(12) United States Patent
Hickey et al.

(10) Patent No.: US 12,623,728 B2
(45) Date of Patent: May 12, 2026

(54) TWIST LOCK ACCESSORY RACK SYSTEM

(71) Applicant: Extang Corporation, Ann Arbor, MI (US)

(72) Inventors: Mark Alan Hickey, Howell, MI (US); Jerome Facchinello, Grand Blanc, MI (US); Dan Delaney, Pinckney, MI (US)

(73) Assignee: Extang Corporation, Ann Arbor, MI (US)

( * ) Notice: Subject to any disclaimer, the term of this patent is extended or adjusted under 35 U.S.C. 154(b) by 532 days.

(21) Appl. No.: 18/067,950

(22) Filed: Dec. 19, 2022

(65) Prior Publication Data

US 2023/0234648 A1     Jul. 27, 2023

Related U.S. Application Data

(60) Provisional application No. 63/299,067, filed on Jan. 13, 2022.

(51) Int. Cl.
B62D 33/02      (2006.01)
B60R 9/06      (2006.01)
B60R 11/00      (2006.01)

(52) U.S. Cl.
CPC ............ B62D 33/0207 (2013.01); B60R 9/06 (2013.01); B60R 2011/0084 (2013.01)

(58) Field of Classification Search
CPC ........ B62D 33/0207; B60R 2011/0084; B60R 9/06; B60R 9/0485; B60P 3/40; B60P 3/42; B60P 9/0815; B60J 7/102; B60J 7/104
USPC .............................................. 296/3; 224/405
See application file for complete search history.

(56) References Cited

U.S. PATENT DOCUMENTS

| | | | | |
|---|---|---|---|---|
| 5,259,711 | A | * | 11/1993 | Beck ..................... B60P 7/0815 |
| | | | | 410/104 |
| 5,393,114 | A | * | 2/1995 | Christensen ............. B60R 9/00 |
| | | | | 296/3 |
| 5,494,327 | A | * | 2/1996 | Derecktor ................ B60P 3/40 |
| | | | | 224/544 |
| 5,921,603 | A | | 7/1999 | Karrer |
| 6,059,159 | A | * | 5/2000 | Fisher ...................... B60R 9/00 |
| | | | | 224/403 |
| 6,238,153 | B1 | * | 5/2001 | Karrer ................... B60P 7/0815 |
| | | | | 410/104 |
| 6,811,066 | B2 | | 11/2004 | Aftanas et al. |

(Continued)

FOREIGN PATENT DOCUMENTS

| | | |
|---|---|---|
| DE | 102008058006 B3 | 8/2010 |
| EP | 1675754 B1 | 1/2008 |

OTHER PUBLICATIONS

Elevate Rack System, TS Rails, Owners Manual.

*Primary Examiner* — Gregory A Blankenship

(57)      ABSTRACT

An accessory rack system comprising a frame rail adapted to couple to a side wall of a cargo area and at least one post engageable with the frame rail. The frame rail comprises one or more frame rail locking features and a tonneau cover support portion adapted for supporting a tonneau cover over the cargo area. The at least one post comprises one or more post locking features extending from an end of the at least one post. One of the post locking features rotates into locking engagement with one of the frame rail locking features so that the at least one post is prevented from disengaging from the frame rail and/or prevented from longitudinal translation along the frame rail.

16 Claims, 13 Drawing Sheets

(56) References Cited

U.S. PATENT DOCUMENTS

| | | | | |
|---|---|---|---|---|
| 6,846,140 | B2 * | 1/2005 | Anderson | B60P 7/0815 |
| | | | | 410/112 |
| 6,959,845 | B2 | 11/2005 | Aftanas et al. | |
| 7,066,364 | B2 | 6/2006 | Kmita | |
| 7,090,103 | B2 | 8/2006 | Aftanas et al. | |
| 7,334,830 | B2 | 2/2008 | Weldy | |
| 7,497,493 | B1 * | 3/2009 | Thiessen | B60P 7/15 |
| | | | | 296/3 |
| 7,604,282 | B2 | 10/2009 | Spencer et al. | |
| 7,753,425 | B2 | 7/2010 | Neidziela et al. | |
| 7,758,091 | B1 | 7/2010 | McCall | |
| 7,874,774 | B2 * | 1/2011 | Peterson | B60P 7/0815 |
| | | | | 410/104 |
| 8,820,811 | B1 | 9/2014 | Hemphill | |
| 9,211,834 | B2 | 12/2015 | Facchinello et al. | |
| 9,440,520 | B2 | 9/2016 | Rohr et al. | |
| 9,688,127 | B2 | 6/2017 | Hemphill et al. | |
| 9,840,135 | B2 | 12/2017 | Rusher et al. | |
| 9,908,391 | B2 | 3/2018 | Williamson et al. | |
| 10,000,114 | B2 | 6/2018 | Rohr et al. | |
| 10,155,480 | B2 | 12/2018 | Ammirati | |
| 10,252,603 | B2 | 4/2019 | Rohr | |
| 10,315,498 | B2 * | 6/2019 | Parkey | B60J 7/198 |
| 10,793,200 | B2 | 10/2020 | Leitner | |
| 11,485,426 | B1 * | 11/2022 | Leslie | B62D 33/0207 |
| 2002/0093216 | A1 * | 7/2002 | Ananian | B60J 7/062 |
| | | | | 296/105 |
| 2004/0131439 | A1 * | 7/2004 | Womack | B60P 7/0815 |
| | | | | 410/104 |
| 2005/0023314 | A1 | 2/2005 | Williams | |
| 2006/0222455 | A1 * | 10/2006 | Senakiewich, II | B60P 7/0815 |
| | | | | 403/252 |
| 2009/0189403 | A1 * | 7/2009 | Voglmayr | B60P 1/02 |
| | | | | 296/3 |
| 2014/0271021 | A1 * | 9/2014 | Cardona | B60N 2/01558 |
| | | | | 410/104 |
| 2023/0234648 | A1 * | 7/2023 | Hickey | B62D 33/0207 |
| | | | | 296/43 |

* cited by examiner

TWIST LOCK ACCESSORY RACK SYSTEM

CROSS REFERENCE

The present application claims priority to U.S. Provisional Patent Application No. 63/299,067, filed on Jan. 13, 2022, and incorporated herein by reference in its entirety for all purposes.

FIELD

The present teachings generally relate to an accessory rack system with posts that twist into locking engagement with frame rails.

BACKGROUND

Some frame rails for supporting accessory racks, sometimes referred to as "ladder racks", are dedicated only to the use of the accessory rack. These frame rails typically install on cargo area side walls and occupy space required for tonneau cover supporting frame rails. Thus, vehicle owners have to choose between the accessory rack and the tonneau cover.

Tonneau covers are typically supported by frame rails installed on the walls of a cargo area. Some frame rails include tracks for mounting accessories such as tie-down cleats. Typically, these accessories are slid into the channel and a separate fastener is used to secure the position of the accessories in the channel. Sometimes this fastener is a screw with a hand or thumb wheel. These types of fasteners may be difficult for some users to manipulate. Moreover, installing screw-type fasteners can be time consuming.

It would be desirable to provide an accessory rack system with posts that secure to frame rails easily relative to prior systems.

It would be desirable to provide an accessory rack system that twists to secure posts to frame rails.

It would be desirable to provide an accessory rack system with posts that twist 180° or less or even more preferably 90° or less to secure the posts to frame rails.

It would be desirable to provide an accessory rack system that precludes the need for separate fasteners.

It would be desirable to provide an accessory rack system with fasteners integrated into posts and/or frame rails.

It would be desirable to provide an accessory rack system with fasteners that prevent rotation of posts relative to frame rails where such rotation would disengage the posts from the frame rails.

It would be desirable to provide a system that supports both an accessory rack and a tonneau cover.

It would be desirable to provide a system that allows for the manipulation of a tonneau cover while the accessory rack is installed on the vehicle.

It would be desirable to provide a system that allows for the manipulation of a tonneau cover without manipulating an accessory rack or accessories stored on the rack.

SUMMARY

The present disclosure relates to an accessory rack system, which may address at least some of the needs identified above.

The accessory rack system may comprise a frame rail. The frame rail may be adapted to couple to a side wall of a cargo area. The frame rail may comprise one or more frame rail locking features. The frame rail may comprise a tonneau cover support portion. The tonneau cover support portion may be adapted for supporting a tonneau cover over a cargo area.

The accessory rack system may comprise at least one post. The at least one post may be engageable with the frame rail. The at least one post may comprise one or more post locking features. The one or more post locking features may extend from an end of the at least one post.

One of the post locking features may rotate into locking engagement with one of the frame rail locking features so that the at least one post is prevented from disengaging from the frame rail and/or prevented from longitudinal translation along the frame rail.

The one or more frame rail locking features may include a track extending at least partially the length of each of the frame rail. The one or more post locking features may include a wedge extending from an end of the at least one post. The track may accept the wedge.

The track may be accessible through an opening defined between two opposing flanges. The width of the track may be greater than the width of the opening.

The width of the wedge may be generally equal to or less than the width of the opening. The wedge may be locatable within the track through the opening by aligning the width of the wedge with the width of the opening. The length of the wedge may be generally equal to the width of the track.

The wedge may comprise two opposing rounded corners and two opposing squared corners. By twisting the wedge, the two opposing rounded corners may slide against opposing surfaces of the track and the two opposing squared corners may preclude further rotation of the wedge.

At least one edge of the wedge may be beveled so that twisting the wedge into locking engagement with the track causes a surface of the track to translate along the at least one beveled edge and frictionally engage with the wedge.

The wedge may be translatable along the length of the track when not in a locked engagement with the track.

The one or more frame rail locking features may include one or more holes disposed at one or more locations along the length of the frame rails. The one or more post locking features may include a pin extending from an end of the at least one post. The hole may be adapted to accept the pin.

The hole may comprise one or more groove guides extending from an inner surface of the hole.

The pin may comprise one or more grooves formed into the pin. The one or more groove guides may translate within the one or more grooves.

The one or more grooves may extend in a first direction along a length of the pin and then in a second direction along a circumference of the pin such that the one or more groove guides may translate in the first direction as the pin is lowered into the hole and rotating the pin may translate the one or more groove guides in the second direction. The second direction may be oriented generally 90° to the first direction.

The frame rail may comprise a first frame rail locking feature and one or more second frame rail locking features. The at least one post may comprise a first post locking feature and a second post locking feature.

The first frame rail locking feature may include a track. The one or more second frame rail locking features may include one or more holes disposed at one or more locations along the length of the frame rail. The first post locking feature may include a wedge that is engageable with the track. The second post locking feature may include a bracket having a hole that is coaxially alignable with the holes of the one or more second frame rail locking features.

Twisting of the at least one post relative to the frame rail may cause the hole of the bracket to align coaxially with the holes of the one or more second frame rail locking features.

The accessory rack system may comprise a locking member. The locking member may comprise a pin and a handle extending from an end of the pin. The pin may extend through the hole of the bracket and into the hole of the one or more second frame rail locking features. The handle may assist a user twist the pin.

The pin of the locking member may be insertable into the second post locking feature and the one or more second frame rail locking features upon the coaxial alignment of the hole of the bracket with the holes of the one or more second frame rail locking features. The locking member may prevent rotation of the wedge within the track.

The one or more holes of the one or more second frame rail locking features may comprise one or more groove guides extending from an inner surface of the one or more holes. The pin may comprise one or more grooves formed into the pin. The one or more grooves may be adapted to accept the one or more groove guides.

The one or more grooves may extend in a first direction along a length of the pin and then in a second direction along a circumference of the pin such that translating the one or more groove guides within the one or more grooves in the second direction prevents axial displacement of the at least one post from the frame rails. The second direction may be oriented generally 90° to the first direction.

The engagement of the at least one post with the frame rail may not interfere with the supporting of a tonneau cover by the frame rail or a folding operation of the tonneau cover.

DETAILED DESCRIPTION

Figure 1A:
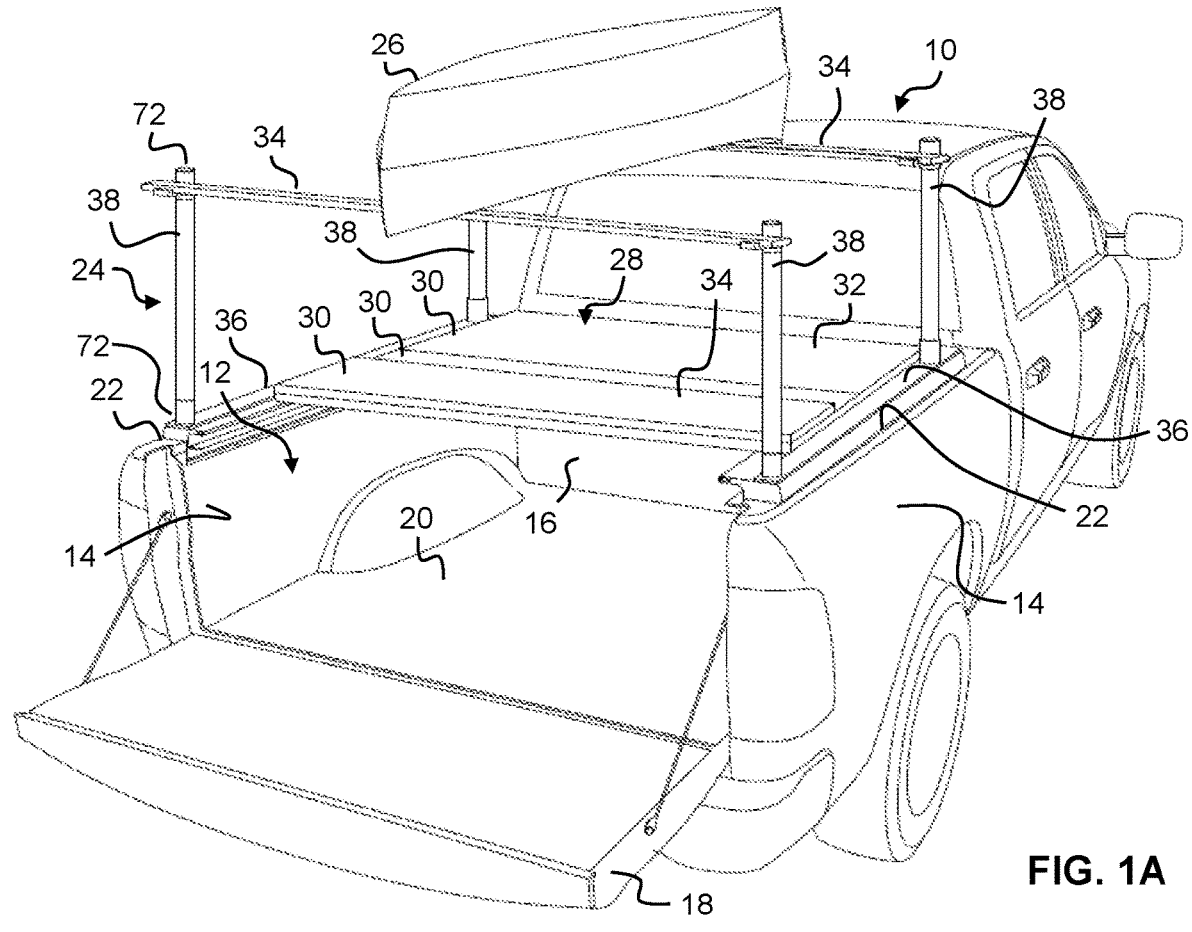
FIG. 1A is a perspective view of a vehicle.

The accessory rack system of the present disclosure may be installed on a vehicle. The accessory rack system may be installed on any vehicle having or towing a cargo area. The vehicle may be a pickup truck, utility vehicle, sports utility vehicle, crossover vehicle, the like, or any combination thereof.

The vehicle may comprise a cargo area (e.g., a bed). The cargo area may function to receive and store cargo. The cargo may include, without limitation, luggage, tools, sports equipment, groceries, construction equipment, construction materials, other personal and/or occupational items, the like, or any combination thereof.

The cargo area may be located to the rear of a passenger area (e.g., a cab). The cargo area may be located on a trailer. The trailer may be towed behind the vehicle. The cargo area may be defined by a plurality of walls. The walls may extend generally vertically from a floor of the cargo area. The walls may include two opposing side walls, a front wall, and a tailgate. The cargo area may be defined by the two opposing side walls, the front wall, the tailgate, and the floor. The front wall and tailgate may be disposed on opposing sides of the cargo area. The front wall and tailgate may extend between the two opposing side walls. The cargo area may be arranged generally symmetrically along a centerline (i.e., longitudinal axis) of the vehicle.

The opposing sides walls, the front wall, and the tailgate may each include a top surface. The top surface may oppose the floor. The accessory rack system of the present teachings may be supported by one or more of the top surfaces. The accessory rack system of the present teachings may be supported by the top surfaces of the two opposing side walls. The frame rails of the accessory rack system may be supported upon the top surfaces of the two opposing side walls.

It may be desirable to cover the cargo area, such as for security and/or preventing intrusion of rain, wind, and/or debris into the cargo area. Accordingly, a tonneau cover may be employed to cover the cargo area.

The accessory rack system may support a tonneau cover. The tonneau cover may function to cover the cargo area; secure cargo; prevent intrusion of rain, wind, and/or debris into the cargo area; or any combination thereof. The tonneau cover, or at least a portion thereof, may fold, lift, or roll to un-cover the cargo area. Accordingly, users may be provided access to the cargo area. The tonneau cover may be unfolded, lowered, or un-rolled to cover the cargo area.

The tonneau cover may include folding-type or rolling-type tonneau covers. The tonneau cover may include hard or soft tonneau covers. An exemplary hard-type rolling tonneau cover is described in U.S. Pat. No. 9,840,135, incorporated herein by reference in its entirety for all purposes. An exemplary soft-type rolling tonneau cover is described in U.S. Pat. No. 9,908,391, incorporated herein by reference in its entirety for all purposes. An exemplary hard-type folding tonneau cover is described in U.S. Pat. No. 9,211,834, incorporated herein by reference in its entirety for all purposes. An exemplary soft-type folding tonneau cover is described in U.S. Pat. No. 7,334,830, incorporated herein by reference in its entirety for all purposes.

The tonneau cover may comprise one or more, two or more, or even three or more panels. The panels may be connected to one another by hinges. The hinges may include mechanical hinges and/or deformable material. The deformable material may be fabricated from polymer. The deformable material may be elastomeric. The panels may be connected to one another along their edges. The panels may be folded onto each other to uncover a cargo area. The panels may be un-folded to cover a cargo area.

The panels may comprise a top surface and an opposing bottom surface. The bottom surface may be oriented toward the floor of the cargo area. The bottom surface may rest upon the accessory rack system. The bottom surface may rest upon frame rails of the accessory rack system. The bottom surface may rest upon a tonneau cover support portion of the frame rails. In an un-folded configuration, the top surface of the panels may be flush with a top surface of the frame rails. In an un-folded configuration, the top surfaces of the panels may be located above top surfaces of the frame rails. The position of the top surfaces of the panels relative to the frame rails may be determined by the position of the tonneau cover support portion of the frame rails.

The top surfaces and bottom surfaces of the panels may contact each other upon folding. By way of example, a three-panel tonneau cover may be folded so that a top surface of a first panel contacts a top surface of an adjacent second panel. The tonneau cover may be folded again so that a bottom surface of the first panel contacts a top surface of a third panel.

The cargo area may have a truck cap installed thereon. The truck cap may function to cover the cargo area, provide vertical space to the covered cargo area, accommodate accessories that would otherwise not fit in the cargo area covered by a tonneau cover, or any combination thereof. The truck cap may extend above the side walls of the cargo area. The truck cap may be employed in alternative to a tonneau cover.

The truck cap may be defined by two or more, three or more, or even four or more walls. The walls may extend above the walls of the cargo area. The walls may extend generally vertically from the walls of the cargo area or at an angle. The walls may be angled toward or away from the centerline of the vehicle.

The truck cap may comprise a roof. The roof may extend between a terminal edge of the walls. The roof may be located opposing the floor of the cargo area. Typically, the roof of the truck cap is coplanar with the roof of the passenger compartment. A truck cap roof disposed below or above the roof of the passenger compartment is contemplated by the present teachings.

One or more of the walls may include one or more windows, hatches, or both. The hatch may be hingedly coupled to the truck cap. The hatch may pivot upward to open. The hatch may pivot to the left or right side of the truck cap to open. The hatch may pivot downward to open. The hatch may provide access to the cargo area. Typically, hatches are located on the wall of the truck cap extending upward from the tailgate.

The truck cap may comprise one or more frame rails as described herein. The frame rails may be located on the roof. Two frame rails may be located on opposing sides of the roof relative to the centerline of the vehicle. A bottom of the frame rail may contact the roof of the truck cap. The frame rail may be offset from the roof by one or more posts.

The truck cap may be fastened to the walls of the cargo area. The truck cap may be fastened to the cargo area by clamps or other fasteners. The fasteners may comprise bolts, rivets, screws, the like, or any combination thereof.

Exemplary truck caps are described in U.S. Pat. Nos. 9,440,520; 10,000,114; 10,252,603; incorporated herein by reference in their entirety for all purposes.

The present teachings provide for an accessory rack system. The accessory rack system may function to support and store cargo and/or accessories above a cargo area, support a tonneau cover, or both. The accessories may include, without limitation, baskets, cargo boxes, cargo bags, sports equipment (e.g., canoes, skis, snowboards, surf boards, and bikes), construction equipment (e.g., ladders), construction materials (e.g., lumber), rooftop tents, the like, or any combination thereof.

The accessory rack system may be advantageous for storing large accessories that may not fit in the cargo area. The accessory rack system may be particularly advantageous for storing elongate accessories that have a length greater than a length of the cargo area. The accessory rack system may expand the storage space of a vehicle.

The accessory rack system may elevate accessories above the height of the passenger compartment (e.g., cab). Accordingly, accessories may extend over the top of a passenger compartment. Thus, elongate accessories may be stored without extending past the tailgate of the vehicle, which could result in unsafe driving conditions for following vehicles or prevent parking in standard-size parking spaces.

The accessory rack system may provide space for a tonneau cover to be manipulated while the accessory rack system is installed on a vehicle. A tonneau cover may be lifted, dropped, folded, un-folded, rolled, and/or un-rolled while the accessory rack system is installed on a vehicle. The accessory rack system need not be un-installed, manipulated, or adjusted in order to manipulate the tonneau cover. Moreover, the accessory rack system may provide space for users to access cargo stored in the cargo area. Cargo may be stored or removed from the cargo area without un-installing, manipulating, or adjusting the accessory rack system.

The accessory rack system may comprise one or more frame rails. The frame rails may function to secure to the side walls of the cargo area, secure posts, support a tonneau cover, distribute weight across the side walls of the cargo area or the roof of a truck cap, or any combination thereof. The accessory rack system typically comprises two frame rails although one frame rail is contemplated by the present teachings. The two frame rails may be secured to the two opposing side walls of the cargo area. The two frame rails may cooperate to support opposing edges of a tonneau cover.

The frame rails may be secured to side walls of the cargo area. The frame rails may be secured to a truck cap. The frame rails may be removably secured to the side walls and/or the truck cap. The frame rails may be fastened to the cargo area side walls or the truck cap by clamps or other fasteners. The fasteners may comprise bolts, rivets, screws, the like, or any combination thereof.

The frame rails may be generally elongate. The frame rails may extend the length of the side walls or the truck cap or at least a portion thereof. The frame rails may be fabricated by extrusion or pultrusion.

The frame rails may be fabricated from polymer, metal, or both. The polymer may include, without limitation, polyethylene, polyurethane, polyvinyl chloride, Nylon, the like, or any combination thereof. The metal may include, without limitation, aluminum, brass, zinc, magnesium, steel, titanium, the like, or any combination thereof.

The frame rails may comprise a side wall support portion. The side wall support portion may function to rest upon a top surface of a side wall, engage posts, or both. The side wall support portion may be located on a side wall. One or more frame rail locking features may be located in the side wall support portion. The side wall support portion may be located outward from a tonneau cover support portion, relative to the centerline of the vehicle. Accordingly, the engagement of one or more posts with the side wall support portion may not inhibit the manipulation of a tonneau cover.

The side wall support portion may comprise a side wall support surface. The side wall support surface may contact a top surface of a side wall. The side wall support surface may be generally flat. The side wall support surface may fit generally flush against the top surface of a side wall.

The side wall support surface may directly or indirectly contact the top surface of a side wall. A spacer, shim, film, fabric, or otherwise may be disposed between the side wall support surface and the top surface of the side wall. Accordingly, surface damage or abrasion may be mitigated or even prevented, noise generation may be mitigated or even prevented, space between the frame rail and side wall may be filled, the frame rail may be positioned higher or lower relative to the floor of the cargo area, or any combination thereof.

The frame rails may comprise a tonneau cover support portion. The tonneau cover support portion may function to support a tonneau cover over a cargo area. The tonneau cover support portion may be located inward from the side wall support portion, relative to the centerline of the vehicle.

The tonneau cover support portion may extend cantilever into the cargo area. The tonneau cover support portion may be supported by the side wall support portion and the clamp plate. The side wall support portion may support the weight of the tonneau cover support portion and the tonneau cover. The clamp plate may brace against the side wall to prevent the side wall support portion from rolling or shifting from the top surface of the side wall.

The tonneau cover support portion may include a tonneau cover support surface. The tonneau cover support surface may function to support a tonneau cover over a cargo area.

The tonneau cover support surface may extend the length of the frame rail or at least one or more portions thereof. The tonneau cover support surface may be generally flat, level, or both. The tonneau cover support surface may be located above, level with, or below the top surface of the side walls. The tonneau cover support surface may be located so the top surfaces of the tonneau cover are flush with the top surface of the side walls. The tonneau cover support surface may be located so the top surfaces of the tonneau cover are positioned above the top surfaces of the side walls.

The tonneau cover support surface may directly or indirectly contact a tonneau cover. A spacer, shim, film, fabric, or otherwise may be disposed between the tonneau cover support surface and the tonneau cover. Accordingly, surface damage or abrasion may be mitigated or even prevented, noise generation may be mitigated or even prevented, the top surfaces of the tonneau cover may be positioned relative to the top surface of the side wall, or any combination thereof.

The frame rails may comprise a clamp plate. The clamp plate may function to cooperate with a fastener and side wall of a cargo area to secure the frame rails to the side walls, brace against the side wall to prevent the side wall support portion from rolling or shifting off of the top surface of the side wall, or both.

The clamp plate may depend generally vertically from the side wall support surface, the tonneau cover support surface, or both. The clamp plate may depend from a portion of the frame rail between the side wall support surface and the tonneau cover support surface.

The clamp plate may comprise a first side and a second side. The second side may oppose the first side. The first side may contact a side wall of a cargo area. The side wall may comprise a downwardly turned lip. That is, the sheet metal forming the top surface of the side walls may be turned downward toward the floor of the cargo area. The second side may be contacted by a fastener. The second side may be contacted by a jaw of a clamp. The second side may be textured. The textured surface may cooperate with a textured surface of a fastener to prevent slippage. The textured surface of the fastener may be located on the jaw of a clamp. By way of example but not limitation, the textured surfaces may be corrugated.

The clamp plate may directly or indirectly contact a side wall. A spacer, shim, film, fabric, or otherwise may be disposed between the clamp plate and the side wall. Accordingly, surface damage or abrasion may be mitigated or even prevented, noise generation may be mitigated or even prevented, space between the frame rail and side wall may be filled, the frame rail may be positioned relative to the centerline of the vehicle, or any combination thereof.

The accessory rack system may comprise one or more fasteners. The fasteners may function to fasten the clamp plate to the side wall of the cargo area. The fasteners may be removable. The pressure applied by the fasteners may be adjustable.

The fasteners may include clamps, bolts and nuts, rivets, screws, the like, or any combination thereof. Bolts, rivets, and screws may extend through holes formed in the clamp plate and side wall. The holes may be pre-formed. Preferably, the fasteners are clamps so that the need for existing holes or drilling of new holes is avoided.

The clamps may comprise two jaws. Tightening of the clamp may cause the jaws to compress together, around the surfaces to be clamped together. One jaw of the clamp may apply pressure to the clamp plate and the other jaw of the clamp may apply pressure to the side wall. The clamp may press the clamp plate and the side wall together. The jaws may be textured. The textured surface may cooperate with a textured surface of a clamp plate and/or side wall of the cargo area to prevent slippage.

One or more, two or more, three or more, or even four or more fasteners may be employed for each frame rail. The fasteners may be located at different points along the length of the frame rails. Accordingly, the frame rails may be evenly supported along the length of the side walls.

The frame rails of a truck cap may be free of a tonneau cover support surface, clamp plate, or both. The frame rails of a truck cap may be fastened to the truck cap. The frame rails may be fastened with bolts, rivets, screws, chemical adhesives (e.g., epoxy), the like, or any combination thereof.

The frame rails may comprise one or more frame rail locking features. The frame rail locking features may function to secure post locking features, prevent axial displacement of posts from frame rails, prevent rotation of a posts relative to frame rails, prevent translation of posts along the length of the frame rails, or any combination thereof.

The frame rail locking features may be located in a side wall support portion of the frame rail. The frame rail locking features may be located outward from a tonneau cover support portion of the frame rail, relative to the centerline of the vehicle. Accordingly, the frame rail locking features may not interfere with the manipulation of a tonneau cover when one or more posts are engaged with the frame rails.

The frame rail locking feature may comprise one or more tracks, holes, or both. As will be appreciated from the teachings herein. The tracks and holes may be employed individually or together to secure posts.

The frame rail locking feature may comprise one or more tracks. The tracks may accept one or more wedges. The track may extend the length of the frame rails or at least a portion thereof. The track may extend a depth into the frame rail.

The track may be accessible through an opening. The opening may be formed through a top surface of the frame rails. The post locking feature (e.g., wedge) may be located within the track by lowering the post locking feature through the opening and into the track.

The post locking feature (e.g., wedge) may translate longitudinally within the track. The post locking feature may be secured within the track by rotating the post relative to the frame rail. Thus, longitudinal translation of the post locking feature may thereby be prevented or at least substantially mitigated. It may be advantageous to prevent longitudinal translation of post locking features within a track after installation to avoid shifting of posts during use (e.g., while the vehicle is being operated).

The track may be defined by flanges, a bottom surface opposing the flanges, and opposing vertical surfaces. The flanges may be in opposing relationship to one another. The flanges may be spaced apart to define an opening. The bottom surface may oppose the flanges. The vertical surfaces may be adjacent to both the flanges and the bottom surface. The vertical surfaces may extend generally vertically between the flanges and bottom surface. The track may have a generally square or rectangular shape, viewed as a cross-section along a transverse plane of the frame rail.

The flanges and opposing bottom surface of the track may apply a pressure to post locking features. The opposing vertical surfaces of the track may apply a pressure to post locking features. That is, spacing between opposing surfaces of the track may be generally equal to or less than corresponding dimensions of post locking features that locate between the surfaces. Accordingly, rotation of the post locking features may cause them to wedge in between opposing surfaces of the track. The surfaces of the track may form an interference-fit with post locking features. Thus, a torque may be required to rotate the posts into a locking engagement and a corresponding torque may be required to un-lock the posts.

The track may comprise an opening. The opening may function to provide access to the track. The opening may be defined by two opposing spaced apart flanges. The space between the flanges may define the width of the opening.

The width of the opening may be less than a width of the track. Post locking features may have a width that is generally equal to or less than the width of the opening. Orienting the width of the post locking features co-axial to the width of the opening may allow the post locking feature to pass through the opening.

Post locking features (e.g., wedges) may have a length that is greater than the width of the opening. Thus, locating portions of the post locking features underneath the flanges may prevent axial displacement of the post locking features from the track.

Post locking features (e.g., wedges) may have a length that is generally equal to or less than the width of the track. Rotating the post locking features to co-axially align length of the post locking features with the width of the track may secure the post locking features within the track. Thus, axial displacement of the post locking features from the track may be prevented.

The track may be disposed into or on a truck cap and/or side wall of a cargo area. The track may be integrally formed in or on a truck cap and/or side wall. The track employed in this manner may obviate a frame rail, or at least the side wall support surface of the frame rail.

The frame rail locking feature may comprise one or more holes. The holes may accept pins. The holes may be located at one or more points along the length of the frame rails. The holes may be spaced apart from each other. The spacing may be uniform or irregular. Spacing the holes along the length of the frame rails may provide users with different options for setting the locations of posts. The holes may extend a depth into the frame rails.

The holes may be formed directly into the frame rails. The holes may be machined into the frame rails. By way of example, the holes may be drilled, reamed, bored, the like, or any combination thereof.

The holes may be formed into inserts. The inserts may be discrete from the frame rails. The inserts may be located into the frame rails. The inserts may be located into a hole formed in the frame rails. The insert may be generally cylindrical, although other three-dimensional shapes may be suitable.

The inserts may be disposed into a truck cap and/or side wall of a cargo area. The holes may be integrally formed in or on a truck cap and/or side wall. The inserts employed in this manner may obviate a frame rail or at least the side wall support surface of the frame rail.

The insert may be fabricated from polymer, metal, or both. The polymer may be plastic or elastomeric. The polymer may include, without limitation, polyethylene, polyurethane, polyvinyl chloride, Nylon, the like, or any combination thereof. The metal may include, without limitation, aluminum, copper, brass, zinc, steel, the like, or any combination thereof.

The insert may be interference-fit within the frame rail. As referred to herein, interference-fit may mean a fastening between two tight-fitting mating parts that produces a joint held together by friction. The insert may be fastened within the frame rail. The insert may be fastened by one or more adhesives, mechanical fasteners, or both.

The holes may comprise one or more groove guides and the pins may comprise one or more grooves, or vice versa.

Each hole or pin may comprise one or more, two or more, or even three or more grooves. Each hole or pin may comprise one or more, two or more, or even three or more groove guides. Each hole or pin may comprise a corresponding number of groove guides as there are grooves in the member that mates with the hole or pin.

The holes or pins may comprise one or more grooves. The grooves may function to guide the movement of a pin within the hole, prevent axial displacement of the pin from the hole, or both. The grooves may accept groove guides.

The grooves may include a first portion and a second portion. The first portion may extend along the length of the holes or pins. The first portion may extend from a first end of the holes or pins toward the second end of the holes or pins. The first portion may first engage with groove guides as the pin is lowered into the hole. The pin may be lowered into the hole until the groove guides locate at an end of the first portion and/or an end of the pin engages an end of the hole. The end of the first portion may open into the second portion.

The first portion may be parallel to the longitudinal axis of the holes or pins. The first portion may extend at an angle to the longitudinal axis of the holes or pins. The angle may be about 1° or more, 3° or more, 5° or more, or even 100 or more. The angle may be about 300 or less, 250 or less, 200 or less, or even 150 or less. Providing the first portion at an angle to the longitudinal axis of the holes or pins may cause the post to rotate as the groove guides translate along the first portion.

The second portion may extend around a circumference of the holes or pins. The second portion may allow rotation of the pins. The pins may be rotated until the groove guides locate at an end of the second portion. Locating the groove guides within the second portion may prevent axial displacement of the post from the frame rail. The first portion may be oriented between about 65° and 115° relative to the second portion. Preferably, the first portion may be oriented about 90° relative to the second portion.

The second portion of the groove may comprise a depression. The depression may be located in the second portion of the groove. Preferably, the depression may be located at an end of the second portion remote from the first portion. The depression may extend a depth into the holes or pins that is greater than the depth of the second portion of the groove. A groove guide in the form of a spring-loaded ball bearing or pin may engaging the depression. The spring-loaded ball bearing or pin may function as a detent. A surface of the depression may comprise a chamfer or fillet. The chamfer or fillet may allow the spring-loaded ball bearing or pin to translate therealong and out of the depression.

The holes or pins may comprise one or more groove guides. The groove guides may function to guide the movement of a pin within the hole, prevent axial displacement of the pin from the hole, or both. The groove guides may translate within grooves.

The groove guides may protrude from inner surfaces of the holes. The groove guides may protrude from an outer surface of the pin.

The groove guides may include bosses, ball bearings, pins, or any combination thereof. The bosses may protrude from the inner surface of the hole. The bosses may protrude from the outer surface of the pin. The bosses may be cast or machined into the insert or frame rail. The bosses may be cast or machined into the pin. The ball bearings or pins may be located within cavities formed in the insert or frame rail. The ball bearings or pins may be located within cavities formed in the pin. The ball bearings may freely rotate within the cavities.

The ball bearings or pins may be spring-loaded so as to function as a detent. Spring-loaded ball bearings or pins may locate into depressions formed within grooves. The depressions may extend a depth into the insert or frame rail. The depressions may extend a depth into a pin. The depth of the depressions may be greater than the depth of the grooves. Accordingly, a greater torque may be required to slide the spring-loaded ball bearings from the depressions and into the grooves relative to the torque required to translate the ball bearings within the grooves. The torque may overcome the pressure a spring exerts on the ball bearing and/or the friction required to slide the ball bearing from the depression into the groove.

The groove guides may be located corresponding to the location of grooves. The groove guides may be located at any point around the inner surface of a hole. The groove guides may be located at any point around the outer surface of a pin. The groove guides may be uniformly or non-uniformly spaced around the inner surface of a hole. The groove guides may be uniformly or non-uniformly spaced around the outer surface of a pin. The groove guides may be located on opposing sides of a hole. The groove guides may be located on opposing sides of a pin. Providing two groove guides in opposing relationship to each other in a hole or on a pin may be advantageous to prevent shifting or rocking of the pin within the hole.

The accessory rack system may comprise one or more posts. The posts may function to support crossbars and/or accessories, store accessories a distance above a cargo area and/or truck cap, or both.

The posts may be generally elongate. The posts may be generally linear. The posts may comprise one or more bends. The posts may be fabricated by extrusion or pultrusion.

The posts may be fabricated from polymer, metal, or both. The polymer may include, without limitation, polyethylene, polyurethane, polyvinyl chloride, Nylon, the like, or any combination thereof. The metal may include, without limitation, aluminum, brass, zinc, magnesium, steel, titanium, the like, or any combination thereof.

The posts may comprise two opposing ends. A first end may comprise one or more post locking features. The first end may contact a frame rail, side wall, or truck cap. A second end may be distanced from the first end. The second end may be located a distance above a cargo area and/or truck cap.

The first end may comprise a flat surface. The flat surface may locate flush with one or more surfaces of the frame rail, side wall, or truck cap. The flat surface may locate atop the flanges of the frame rail. Advantageously, this flush mating of the two surfaces may preclude rocking or shifting between the post and the frame rail. As the posts may be adapted to be load bearing, this flush mating may preclude rocking or shifting when a load is applied to the posts.

The length of the posts may vary but typically the length is large enough to allow manipulation of a tonneau cover while the accessory rack system is installed on the vehicle. That is, the length may generally equal to or greater than the width of the widest tonneau cover panel or the largest diameter of a rolled-up tonneau cover. The width of the tonneau cover panels may be measured in the direction from the passenger compartment to the tailgate. Where a load bearing tonneau cover is used, the length of the posts may accommodate cargo or luggage in a space between the tonneau cover and crossbars supported by the posts. The posts may extend to a height that is less than, generally equal to, or even greater than the height of the roof of the cab. Different posts may be provided that suit different use cases and the desires of different consumers.

Where the accessory rack system is employed with a truck cap, the length of the posts may be shorter relative to the side wall mounted accessory rack system. That is, the roof of the truck cap already extends a distance above the cargo area so the posts may have a shorter length. The length of the posts may provide a distance between accessories and/or crossbars and a surface of the roof of the truck cap so that contact of the accessories with the roof may be precluded. Moreover, the distance between the roof of the truck cap and the accessories and/or crossbars provides space for mounting brackets and/or mounts (e.g., bike brackets) to the crossbar.

The posts may extend generally vertically or at an angle, relative to the top surface of the side walls or roof of the truck cap. The posts may extend at an angle of about 2° or more, 5° or more, 10° or more, or even 15° or more, from vertical. The posts may extend at an angle of about 35° or less, 30° or less, 25° or less, or even 20° or less, from vertical. Angularly extending posts may extend toward the centerline of the vehicle.

Typically, the accessory rack system comprises at least two posts. The posts may be employed in pairs in order to support the two opposing ends of a crossbar. Two posts may secure to a single crossbar. The two posts supporting a crossbar may be engaged to opposing frame rails. The two posts supporting a crossbar may be located generally at corresponding points along the length of the opposing frame rails. The two posts supporting a crossbar may be engaged to the same frame rail.

The accessory rack system may comprise one or more crossbars. The crossbars may function to support one or more accessories. The crossbars may comprise a surface upon which accessories may be stored. The surface may be textured. The textured surface may mitigate or substantially prevent slippage of the accessories.

The crossbars may accept brackets and/or mounts. The brackets and/or mounts may be configured to secure specific items. By way of example, brackets configured to secure bike wheels may be attached to the crossbars. By way of another example, brackets configured to secure a kayak may be attached to the crossbars. The crossbars may provide one or more tie-down members. By way of example, ratchet straps may extend around accessories and be secured at their ends to the tie-down members.

The crossbars may extend across the width of the cargo area. The crossbars may extend the distance between opposing side walls. The crossbars may extend along a length of the frame rails.

The crossbars may be located a distance above the cargo area. The height of the crossbars may be adjustable. The crossbars may be located below, generally level with, or even above the roof of the passenger compartment (e.g., cab).

The crossbars may comprise two opposing ends. Each end may secure to a post. The posts may be located on opposing frame rails. The posts may be located on the same frame rail.

The posts may comprise one or more tracks. The tracks may extend along a length of the posts, or at least a portion thereof. The crossbars may be secured within the tracks. The crossbars may translate longitudinally within the tracks. The height of the crossbars may be adjusted by translating the crossbars within the tracks.

The crossbar may comprise sheaths on the opposing ends of the crossbar. The sheaths may comprise a hole adapted to accept a post. The sheaths may slide onto the posts. The sheaths may translate along the length of the posts.

The crossbar may be fastened to the posts by screws, pins, clamps, the like, or any combination thereof.

One or both ends of the crossbar may comprise a pin, a wedge, a track, and/or a hole, hereinbefore described. One or both ends of the crossbar may twist into locking engagement with one or more posts.

Where the crossbar comprises a pin or a wedge, the post comprises a track or a hole, or vice versa.

The crossbars may be installed on posts after rotating posts into securement with frame rails. The crossbars may prevent rotation of the posts out of securement with frame rails.

The posts may comprise one or more post locking features. The post locking features may function to secure a post to a frame rail, prevent axial displacement of a post from a frame rail, prevent rotation of a post, guide the longitudinal translation of a post along a length of a frame rail, or any combination thereof.

The post locking features may comprise a wedge, a pin, a bracket, or any combination thereof. The scope of the present teachings includes employing one or more or even two or more of the post locking features simultaneously.

The post locking features may comprise a wedge. The wedge may locate within a track. The wedge may be located at an end of a post. The center of the wedge may be aligned with the central longitudinal axis of the post. The wedge may be a rectangular prism in shape.

The wedge may be defined by a width. The width may be generally equal to or less than a width of the opening to the track. The width of the wedge may allow the wedge to pass through the opening when the width of the wedge is co-axial with the width of the opening.

The wedge may be defined by a length. The length of the wedge may be greater than the width of the opening. Rotation of the wedge may cause portions of the wedge to locate underneath the flanges defining the opening. Thus, axial displacement of the wedge from the track may be prevented.

The wedge may comprise one or more rounded corners. The rounded corners may function to allow rotation of the wedge within the track. The rounded corners may be formed on opposing corners of the wedge. A length of the wedge from any point on the rounded corner to a corresponding opposing point on the opposing rounded corner may be generally uniform around the entire corner. This length may be generally equal to the width of the track. Thus, upon rotation of the wedge, the rounded corners and surfaces of the track slide against each other.

The wedge may comprise one or more squared corners. The squared corners may function to prevent rotation of the wedge within the track. The squared corners may be formed on opposing corners of the wedge. The length from one corner to the opposing corner may be greater than the width of the track.

Thus, continued rotation of the wedge in the direction accommodated by the rounded corners may be precluded by the squared corners contacting the surfaces of the track.

All corners of the wedge may be rounded although it may be advantageous to provide the wedge with two opposing squared corners to prevent continued rotation of the wedge. In this manner, one direction of rotation is dedicated to securing the wedge within the track and the other direction of rotation is dedicated to un-securing the wedge from the track.

The direction of rotation may be clockwise or counter-clockwise. The direction of rotation may be directed by the location of the rounded and squared corners. Swapping the location of the rounded and squared corners may change the direction of rotation from clockwise to counterclockwise, or vice versa.

The wedge may comprise one or more bevels. The bevels may function to engage the wedge between flanges defining an upper surface of the track and an opposing bottom surface of the track, provide a smooth sliding of the wedge against surfaces of the track, or both.

The bevels may provide the wedge with a thickness that increases from a corner and/or side of the wedge toward the center of the wedge. The greatest thickness of the wedge may be generally equal to the height of the track. Rotation of the wedge may cause the bevels to translate along surfaces of the track. As the thicker portion of the wedge comes into contact with the track surfaces during rotation of the wedge, the track may exert a pressure on the wedge and/or form an interference fit.

A neck may extend between an end of the post and the wedge. The neck may be defined by a diameter or cross-sectional width. The diameter or cross-sectional width of the neck may be generally equal to or less than a width of an opening to a track. The neck may extend through an opening when a wedge is located within a track.

The post locking feature may comprise a pin. The pin may engage a hole. The pin may extend from an end of the post. The length of the pin may be co-axial with the longitudinal axis of the post. The pin may be generally cylindrical. The pin may have a tapered end. The tapered end may oppose the end of the pin contacting the end of the post. The tapered end may aid in locating the pin into a hole.

The pins may comprise one or more grooves and the holes in which the pins locate may comprise one or more groove guides, or vice versa. The grooves and groove guides are described hereinbefore.

The post locking feature may comprise a bracket. The bracket may function to engage a locking member, prevent rotation of the post relative to the frame rail, or both. The bracket may extend from an end of the post. The bracket may extend transverse from the longitudinal axis of the post. The bracket may be co-planar with the surface of the end of the post.

The bracket may be employed as a second post locking feature in cooperation with a first post locking feature (e.g., pin or wedge). The first post locking feature may rotate and secure within a first frame rail locking feature. Rotation of the post may cause the bracket to rotate and locate over a second frame rail locking feature.

The bracket may comprise a hole. The hole may extend through the bracket. The hole may locate over a second frame rail locking feature. The second frame rail locking feature may comprise a hole formed in a frame rail. A locking member may extend through the hole of the bracket and the hole of the frame rail. The bracket and locking member may prevent rotation of the post relative to the frame rail.

The accessory rack system may comprise a locking member. The locking member may function to prevent rotation of a post relative to a frame rail. The locking member may engage a bracket extending from the post. The locking member may comprise a pin that extends through a hole in the bracket and into a hole in the frame rail.

Rotation of the post relative to the frame rail may cause a hole in the bracket to align with a hole in the frame rail. Upon alignment, the locking member may be inserted both through the hole in the bracket and the hole in the frame rail. The locking member may be rotated to secure the locking member with the frame rail locking feature.

The locking member may comprise a pin. The pin may engage a post locking feature (e.g., bracket) and a frame rail locking feature (e.g., hole). The pin may extend from a handle of the locking member. The pin may be generally cylindrical. The pin may have a tapered end. The tapered end may oppose the end of the pin contacting the handle. The tapered end may aid in locating the pin into a hole.

The pins may comprise one or more grooves and the frame rail holes in which the pins locate may comprise one or more groove guides, or vice versa. The grooves and groove guides are described hereinbefore.

The locking member may comprise a handle. The handle may function as a gripping member to assist users rotate the pin. The handle may be straight or curved. The curvature of the handle may correspond to a surface profile of a post. The handle may be radially positioned relative to the grooves or groove guides in the pin such that the handle, or at least a portion thereof, abuts the post when the pin is fully rotated. Advantageously, this corresponding curvature and/or radial positioning of the handle may provide the handle a flush contact with the post. Thus, the handle may not stick out and the possibility of being caught on objects may be prevented or at least substantially mitigated.

The accessory rack system of the present disclosure may comprise one or more posts, each with a wedge, and frame rails, each with a track. The wedges may locate within the tracks.

The accessory rack system of the present disclosure may comprise one or more posts, each with a pin, and frame rails, each with one or more holes. The pins may locate within the one or more holes.

The accessory rack system of the present disclosure may comprise one or more posts, each with a hole, and frame rails, each with one or more pins. The pins may locate within the one or more holes.

The accessory rack system of the present disclosure may comprise one or more posts, each with a wedge and a bracket, and frame rails, each with a track and one or more holes. The wedges may locate within the tracks. Upon rotation of the wedges within the track, a hole formed in each of the brackets may locate over the holes of the frame rails. A locking member may be applied to the posts and frame rails to prevent rotation of the posts relative to the frame rails. The locking member may comprise a pin. The pin may extend through the holes of the brackets and the holes of the frame rails.

The accessory rack system of the present disclosure may comprise one or more posts, each with a pin and a bracket, and frame rails, each with a first set of one or more holes and a second set of one or more holes. The first set may be provided a distance from the second set. The one or more holes within the first set may be aligned in a row. The one or more holes within the second set may be aligned in a row. Upon rotation of the pins within the first set of one or more holes, a hole formed in each of the brackets may located over the second set of one or more holes in the frame rails. A locking member may be applied to the posts and frame rails to prevent rotation of the posts relative to the frame rails. The locking member may comprise a pin. The pin may extend through the holes of the brackets and the second set of one or more holes of the frame rails.

The accessory rack system of the present disclosure may comprise one or more posts, each with a first post locking feature (e.g., wedge) and a second post locking feature (e.g., bracket), and frame rails, each with a first frame rail locking feature (e.g., track) and one or more second frame rail locking features (e.g., holes). The first post locking feature and first frame rail locking feature may cooperate to prevent axial displacement of the posts from the frame rails and/or longitudinal translation of the first post locking feature within the first frame rail locking feature. The second post locking feature the one or more second frame rail locking features may cooperate, to prevent rotation of the post relative to the frame rail.

The first frame rail locking feature (e.g., track) and one or more second frame rail locking features (e.g., holes) may be spaced apart from each other. The first frame rail locking feature may be located outward from the one or more second frame rail locking features, relative to the centerline of the vehicle. The one or more second frame rail locking features may be located outward from the first frame rail locking feature, relative to the centerline of the vehicle.

The one or more second frame rail locking features (e.g., holes) may be provided in a row. The one or more second frame rail locking features may be arranged parallel to the first frame rail locking feature (e.g., track).

Figure 1B:
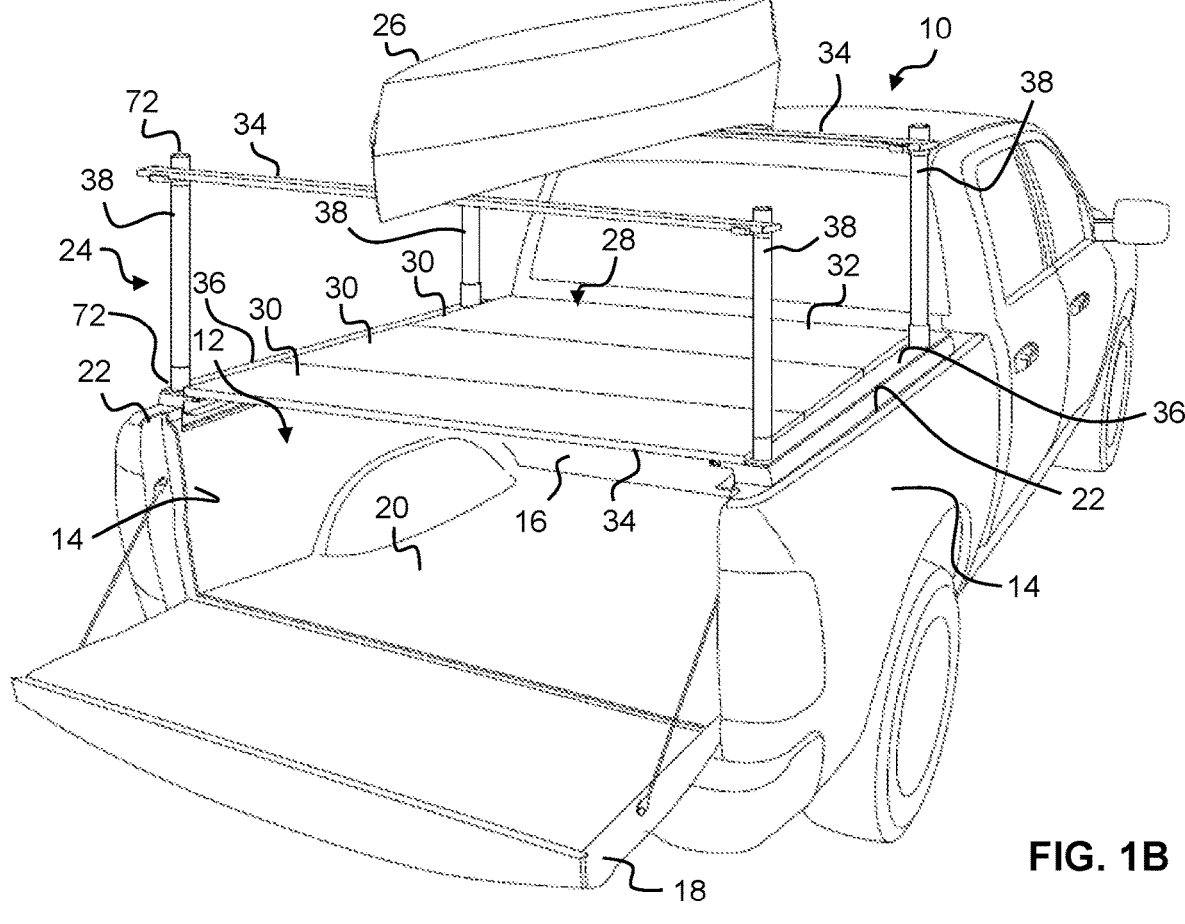
FIG. 1B is a perspective view of a vehicle.

FIG. 1A and FIG. 1B illustrate a perspective view of a vehicle 10. The vehicle 10 comprises a cargo area 12 defined by two opposing side walls 14, a front wall 16, a tailgate 18, and a floor 20. Each of the side walls 14 include a top surface 22 in opposing relationship to the floor 20.

The cargo area 12 is outfitted with an accessory rack system 24 according to the present disclosure. The accessory rack system 24 is employed to simultaneously support both of one or more accessories 26 (e.g., ladders, kayaks, and the like) and a tonneau cover 28 above the cargo area 12.

The tonneau cover 28 comprises one or more, two or more, three or more, or even four or more panels 30. The panels 30 are typically hard panels although soft panels are within the scope of the present teachings. The panels 30 fold onto each other, shown in FIG. 1A, to expose the cargo area 12 or at least a portion thereof. The panels 30 unfold, shown in FIG. 1B, to cover the cargo area 12 or at least a portion thereof. Each of the panels 30 comprise a top surface 32a and an opposing bottom surface 32b. The bottom surfaces 32b of the panels 30 are oriented toward the floor 20 when they are unfolded. The bottom surfaces 32b of the panels 30 interface with frame rails 36. Folding or unfolding of the tonneau cover 28 is uninhibited by the accessory rack system 24 or accessories 26 stored above the cargo area 12. Accordingly, the tonneau cover 28 can be opened to gain access to the inside of the cargo area 12 without having to move or manipulate the accessory rack system 24 or the accessories 26 stored on the accessory rack system 24.

The accessory rack system 24 comprises two frame rails 36 and at least one post 38. As illustrated in FIG. 1A and FIG. 1B, the accessory rack system 24 comprises four posts 38. The frame rails 36 are located on the top surfaces 22 of the opposing side walls 14. The frame rails 36 are arranged as mirror-images of one another. The posts 38 comprise an end 72a engaging the frame rails 36 and an opposing end 72b distanced from the frame rails 36. The posts 38 can engage and fasten to the frame rails 36. The posts 38 can be unfastened and disengaged from the frame rails 36. The posts 38 can be positioned at any location along the length of the frame rails 36, between the front wall 16 and the tailgate 18. The posts 38 can be selectively positioned to suit the weight and/or physical dimensions of the accessories 26 being supported by the accessory rack system 24. By way of example, spacing between the fore pair of posts 38 (i.e., closer to the front wall 16) and the aft pair of posts 38 (i.e., closer to the tailgate 18) can be increased to support longer accessories 26. The posts 38 support crossbars 34 extending over the cargo area 12. The crossbars 34 extend from a post 38 associated with one side wall 14 to another post 38 associated with an opposing side wall 14. The crossbars 34 support accessories 26.

Figures 2A, 2B:
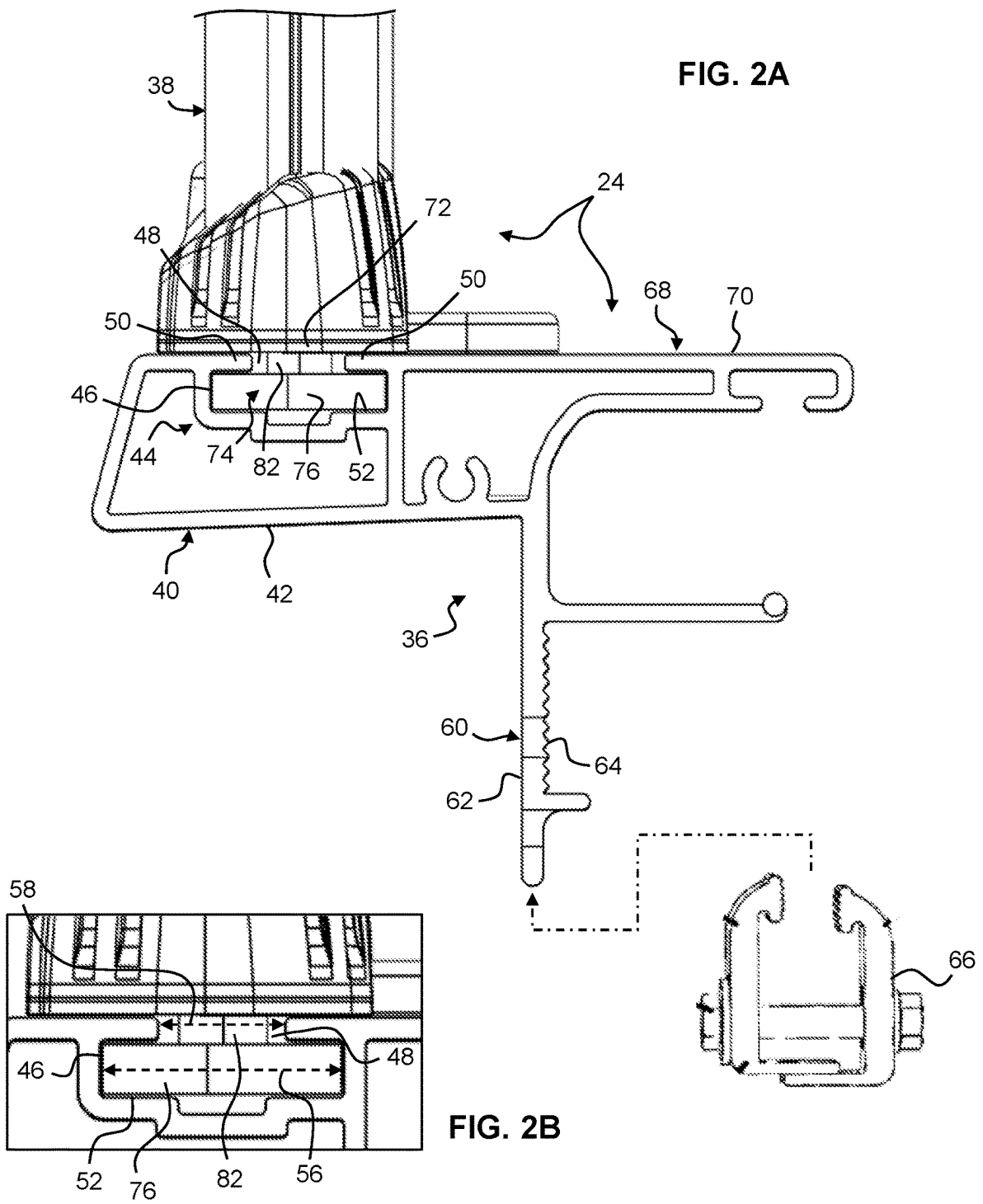
FIG. 2A is a plan view of an accessory rack system.
FIG. 2B is a plan view of an accessory rack system.

FIG. 2A and FIG. 2B illustrate a plan view of an accessory rack system 24. The accessory rack system 24 comprises two frame rails 36, as shown in FIG. 1A and FIG. 1B. The frame rail 36 illustrated in FIG. 2A is arranged a mirror image of an opposing frame rail 36 which locates onto an opposing side wall 14 of a cargo area 12.

The frame rail 36 comprises a side wall support portion 40. The side wall support portion 40 has a side wall support surface 42 that interfaces with the top surface 22 of the side wall 14 when the frame rail 36 is installed thereon. Such interface may be direct contact or indirect contact with the top surface 22. Indirect contact may mean that one or more members—such as spacers, protective films, or the like—is disposed between the side wall support surface 42 and the top surface 22. The side wall support portion 40 includes a frame rail locking feature 44, which is a track 46. The track 46 extends the length of the frame rail 36 or at least a portion thereof. The track 46 is accessible via an opening 48 defined between two spaced apart opposing flanges 50. The flanges 50 oppose a bottom surface 52 of the track 46.

The frame rail 36 comprises a clamp plate 60. The clamp plate 60 extends downward from the side wall support portion 40. The clamp plate 60 extends below the top surface 22 of the side wall 14 shown in FIG. 1A and FIG. 1B. The clamp plate 60 comprises a first side 62 that interfaces with the side wall 14 and a second side 64 opposing the first side 62, oriented away from the side wall 14. Such interface may be direct contact or indirect contact with the side wall 14. Indirect contact may mean that one or more members—such as spacers, protective films, bed liners, or the like—is disposed between the first side 62 of the clamp plate 60 and the side wall 14. The clamp plate 60 provides for the securement of the frame rail 36 to the side wall 14 of the cargo area 12. A fastener 66 (e.g., clamp) removably fastens the clamp plate 60 to the side wall 14. The second side 64 of the clamp plate 60 has a textured surface. The textured surface may cooperate with a textured surface of the fastener 66 to prevent slippage. One jaw of the fastener 66 applies pressure to the clamp plate 60 and the other jaw of the fastener 66 applies pressure to the side wall 14 or a structure thereof such as a downward turned lip.

The frame rail 36 comprises a tonneau cover support portion 68. Installed on a vehicle, the tonneau cover support portion 68 extends inwardly toward the centerline of the vehicle 10 from the side wall support portion 40. The tonneau cover support portion 68 has a tonneau cover support surface 70 that supports a tonneau cover 28 over the cargo area 12. Bottom surfaces 32b of the tonneau cover 28 panels 30 rest upon the tonneau cover support surface 70.

The accessory rack system 24 comprises at least one post 38. The post 38 comprises two opposing ends 72, shown in FIG. 1A and FIG. 1B. One of the ends 72 contacts the frame rail 36. A post locking feature 74 is located on the end 72 contacting the frame rail 36. The post locking feature 74 cooperates with the frame rail locking feature 44 to secure the post 38 to the frame rail 36. The post locking feature 74 comprises a wedge 76 and a neck 82. The neck 82 is a narrowed section that extends between the post locking feature 74 and the end 72 of the post 38. The wedge 76 is locatable within the track 46, through the opening 48 and the neck 82 extends through the opening 48. A width 56 of the track 46 is greater than a width 58 of the opening 48, as shown in FIG. 2B. The wedge 76 is secured to the post 38 by rotation of the post 38 to cause the wedge 76 to locate underneath the flanges 50, preventing the axial displacement of the post 38 from the frame rail 36. In other words, rotation of the post 38 locks the post 38 to the frame rail 36.

Figure 3:
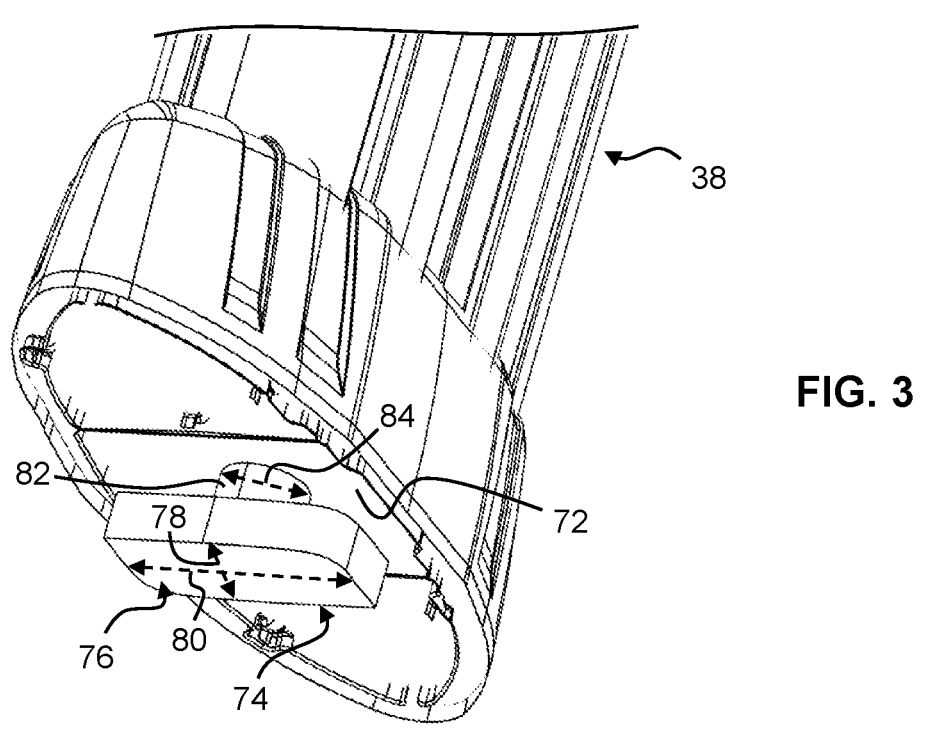
FIG. 3 is a perspective view of a post.

FIG. 3 illustrates a bottom perspective view of a post 38. The post 38 comprises two opposing ends 72, shown in FIG. 1A and FIG. 1B. One end 72 includes a post locking feature 74. The post locking feature 74 comprises a wedge 76 and a neck 82. The wedge 76 is generally a rectangular prism in shape with a width 78 suitable for passing through an opening 48 to a track 46 and a length 80 suitable for engaging both flanges 50 upon rotating the post 38, as shown in FIG. 2B, to prevent removal of the wedge 76 from the track 46. The wedge 76 is spaced from the end 72 of the post 38 and a neck 82 extends from the end 72 of the post 38 to the wedge 76. The neck 82 has a diameter 84 suitable for fitting within the opening 48 to the track 46, as shown in FIG. 2B. The diameter 84 of the neck 82 can be generally equal to or less than the width 54 of the opening 48, shown in FIG. 2B.

Figure 4A:
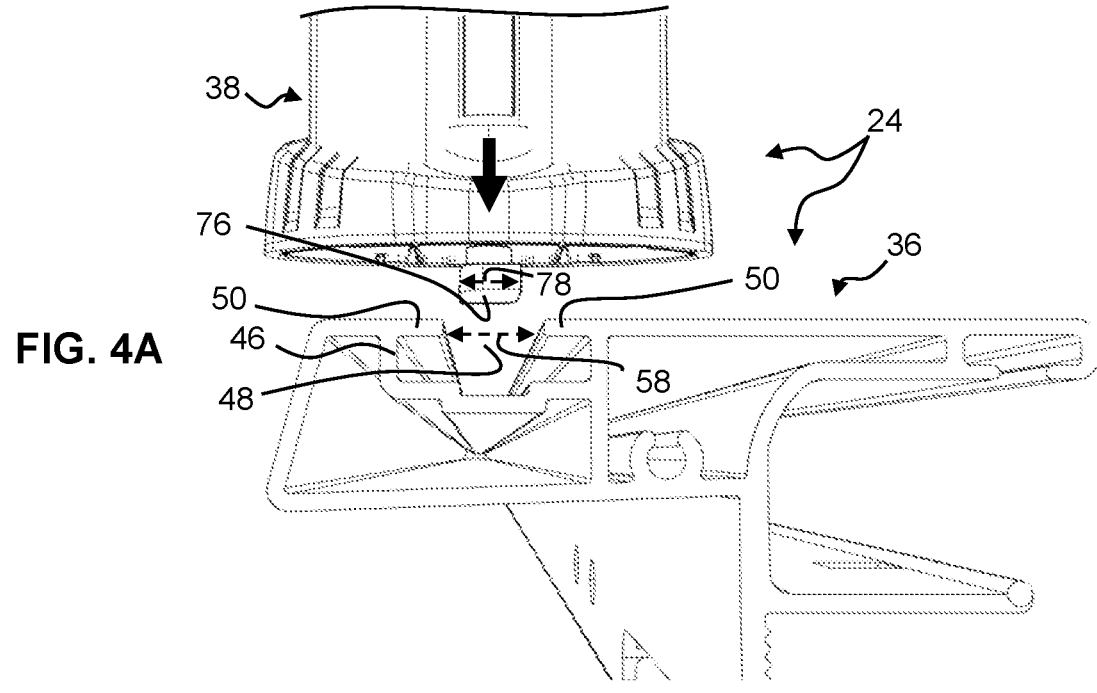
FIG. 4A illustrates a locking operation of an accessory rack system.
Figures 4B, 4C:
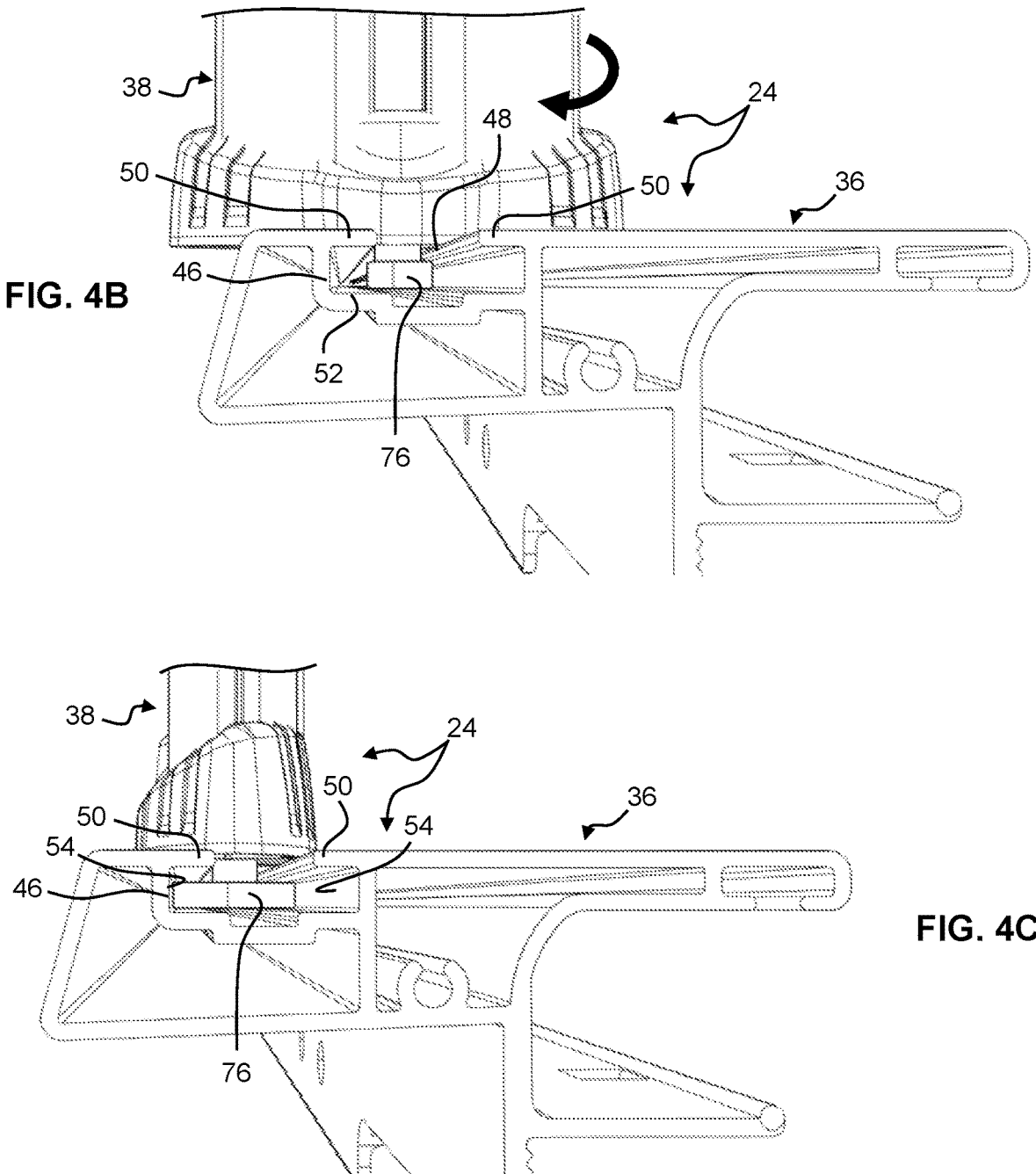
FIG. 4B illustrates a locking operation of an accessory rack system.
FIG. 4C illustrates a locking operation of an accessory rack system.

FIG. 4A through FIG. 4C illustrate a locking operation of an accessory rack system 24 according to the present disclosure.

In FIG. 4A, a post 38 is being brought into engagement with a frame rail 36. A wedge 76 of the post 38 is axially lowered into an opening 48 of the frame rail 36. The post 38 is radially oriented so that a width 78 of the wedge 76 aligns with a width 58 of the opening 48, the width 58 being defined between two flanges 50.

In FIG. 4B, the wedge 76 has passed through the opening 48 and is located within the track 46 in the frame rail 36. The post 38 is rotated clockwise relative to the frame rail 36 to engage the wedge 76 between the flanges 50 and a bottom surface 52 of the track 46, shown in FIG. 4C.

In FIG. 4C, the post 38 is in a locked engagement with the frame rail 36. The wedge 76 is prevented from axial displacement from the track 46 by the flanges 50. Rotation of the post 38 also causes the wedge 76 to engage opposing vertical surfaces 54 of the track 46. Counterclockwise rotation of the post 38 relative to the frame rail 36 allows for the post 38 to be disengaged from the frame rail 36.

Figure 5A:
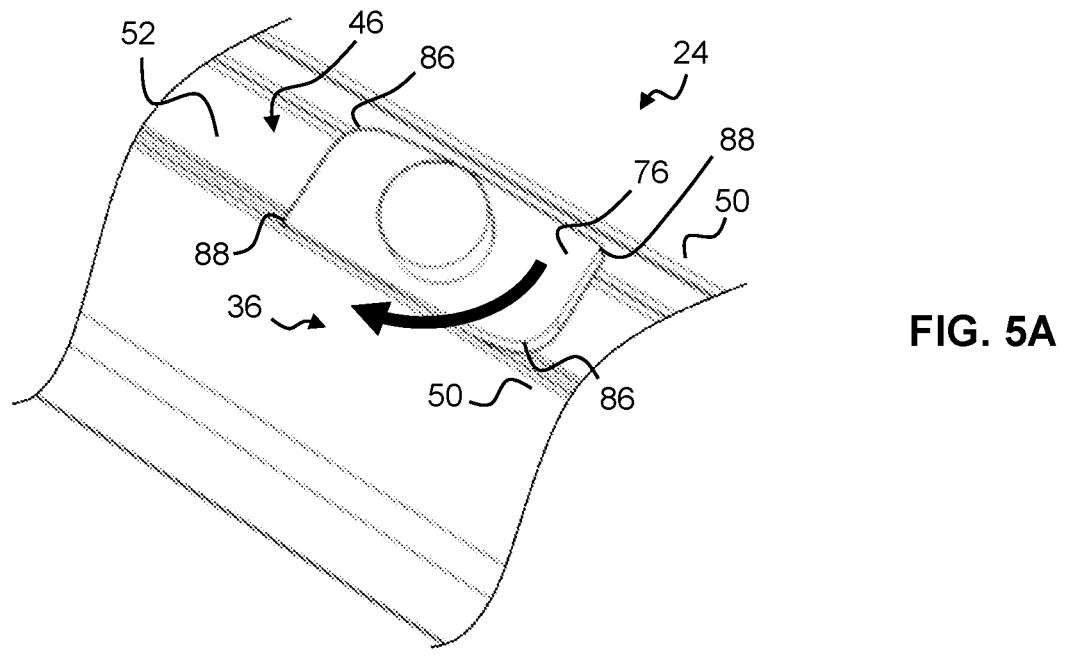
FIG. 5A illustrates a locking operation of an accessory rack system.
Figure 5B:
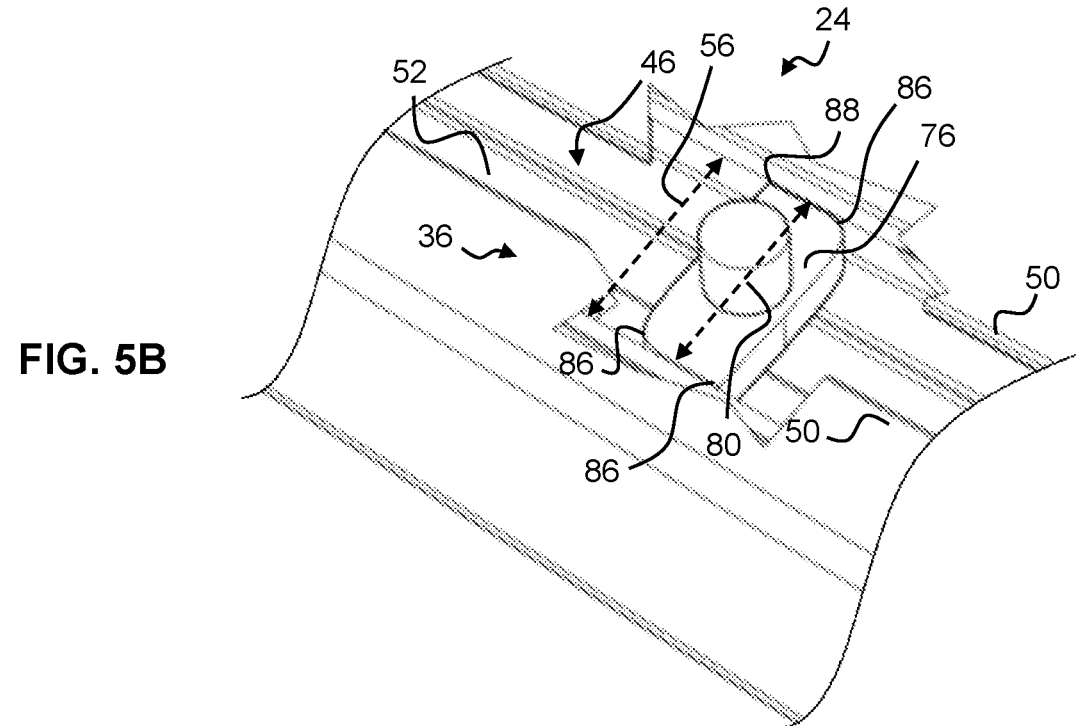
FIG. 5B illustrates a locking operation of an accessory rack system.

FIG. 5A and FIG. 5B illustrate a locking operation of an accessory rack system 24 according to the present disclosure. FIG. 5A provides another perspective of the accessory rack system 24 illustrated in FIG. 4B. FIG. 5B provides another perspective of the accessory rack system 24 illustrated in FIG. 4C.

In FIG. 5A, the wedge 76 is located within the track 46 in the frame rail 36. The wedge 76 is then rotated clockwise relative to the frame rail 36 and into engagement between the flanges 50 and bottom surface 52 of the track 46, shown in FIG. 5B. Rotation of the post 38 also causes the wedge 76 to engage opposing vertical surfaces 54 of the track 46, shown in FIG. 4C. The wedge 76 is prevented from axial displacement from the track 46 by the flanges 50.

The wedge 76 comprises two opposing rounded corners 86 and two opposing squared corners 88. By rotating the wedge 76 within the track 46, the rounded corners 86 slide against opposing vertical surfaces 54 of the track 46, shown in FIG. 4C. The rounded corners 86 provide the wedge 76 with approximately 90θ of rotation. The squared corners 88 preclude further rotation of the wedge 76. The length 80 of the wedge 76 is generally equal to the width 56 of the track 46.

Figure 6:
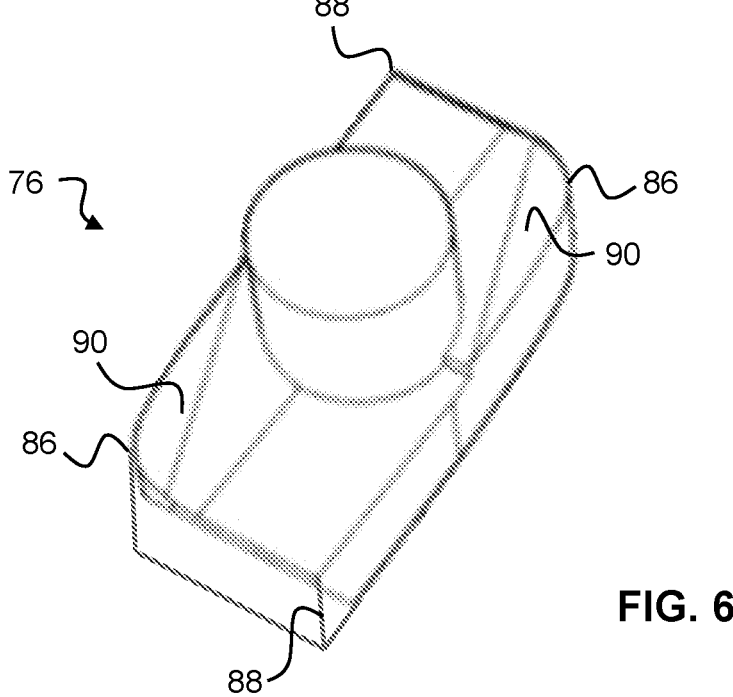
FIG. 6 is a perspective view of a wedge.

FIG. 6 illustrates a wedge 76 according to the present disclosure. The wedge 76 comprises bevels 90 on opposing sides of the wedge 76. The bevels 90 ramp upward from the rounded corners 86 of the wedge 76. By rotating the wedge 76 within the track 46, as illustrated in FIG. 5A and FIG. 5B, the bevels 90 slide against the flanges 50 of the track 46. The bevels 90 exert an increasing pressure upon the flanges 50 as the wedge 76 is rotated.

Figure 7:
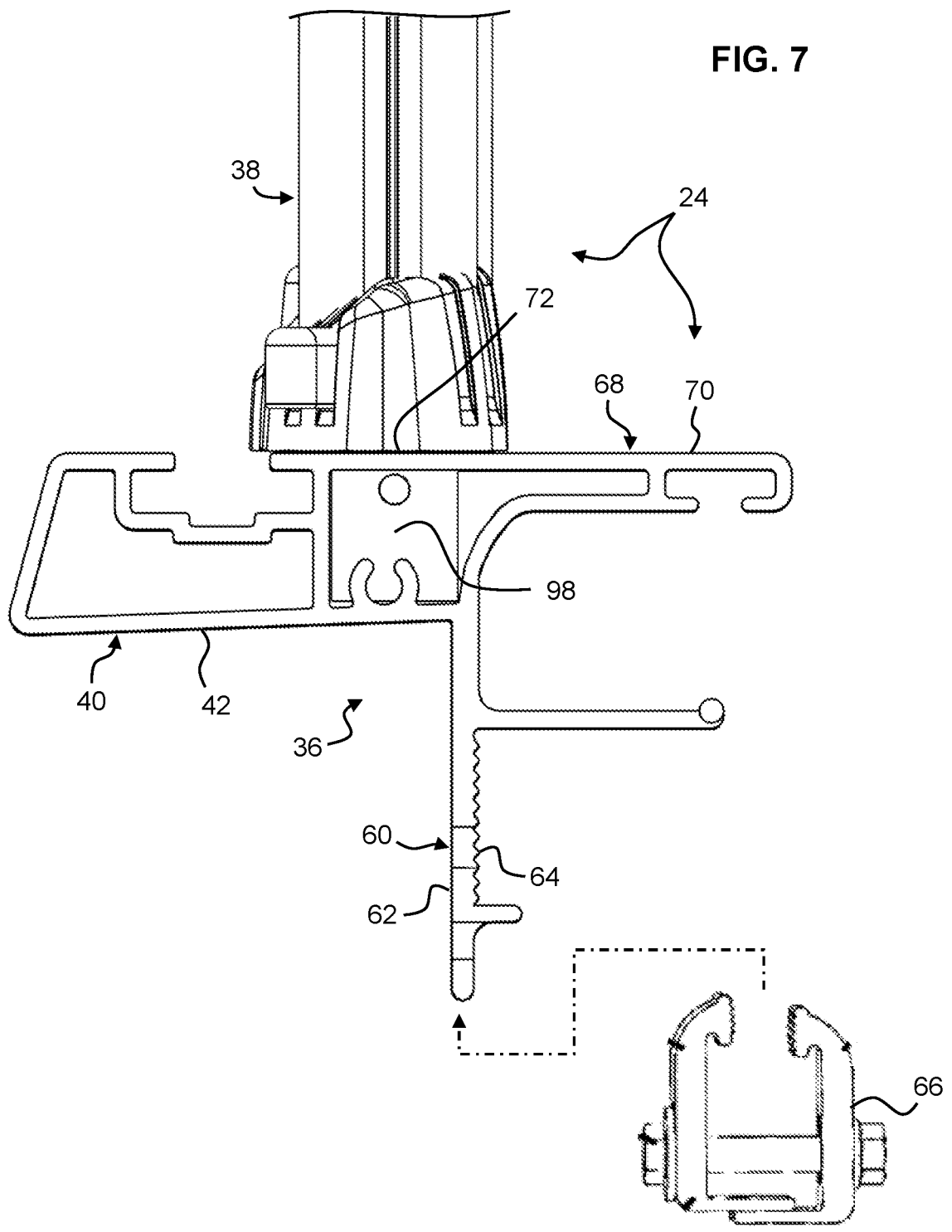
FIG. 7 is a plan view of an accessory rack system.

FIG. 7 illustrates a plan view of an accessory rack system 24. The accessory rack system 24 comprises two frame rails 36, such as shown in FIG. 1A and FIG. 1B. The frame rail 36 illustrated in FIG. 7 is arranged as a mirror image to an opposing frame rail 36 which locates onto an opposing side wall 14 of a cargo area 12.

The frame rail 36 comprises a side wall support portion 40. The side wall support portion 40 has a side wall support surface 42 that interfaces with the top surface 22 of the side wall 14 when the frame rail 36 is installed thereon. The side wall support portion 40 includes a frame rail locking feature 98.

The frame rail 36 comprises a clamp plate 60. The clamp plate 60 extends downward from the side wall support portion 40. The clamp plate 60 extends below the top surface 22 of the side wall 14 shown in FIG. 1A and FIG. 1B. The clamp plate 60 comprises a first side 62 that interfaces with the side wall 14. The clamp plate 60 comprises a second side 64 opposing the first side 62, oriented away from the side wall 14. The second side 64 has a textured surface. A fastener 66 (e.g., clamp) removably fastens the clamp plate 60 to the side wall 14.

The frame rail 36 comprises a tonneau cover support portion 68. The tonneau cover support portion 68 extends from an edge of the top surface 22 of the side wall 14, shown in FIG. 1A and FIG. 1B, and over a cargo area 12. The tonneau cover support portion 68 comprises a tonneau cover support surface 70 that supports a tonneau cover 28 over the cargo area 12. Bottom surfaces 32b of the tonneau cover 28 panels 30 interface with the tonneau cover support surface 70.

Figures 8, 9:
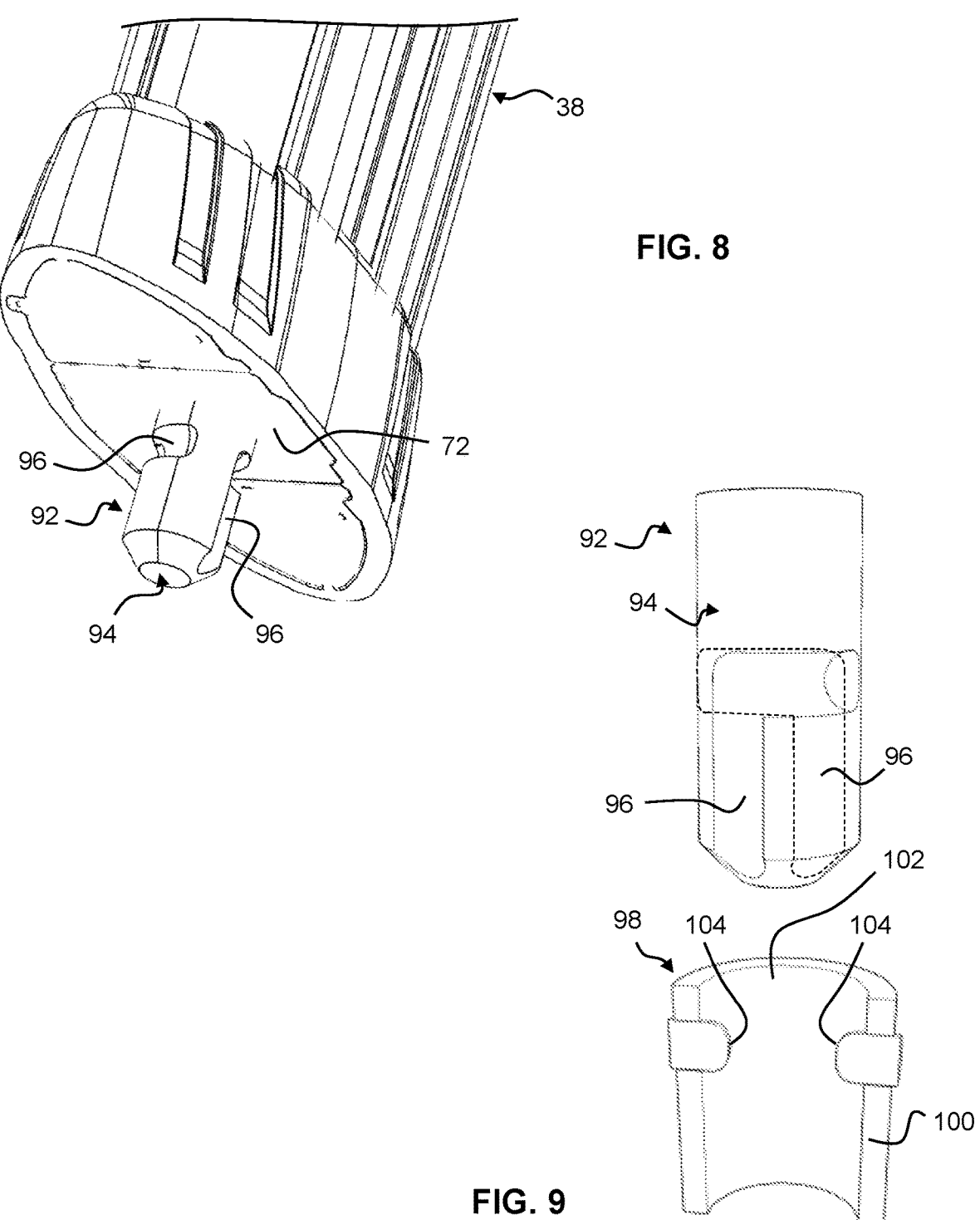
FIG. 8 is a perspective view of a post.
FIG. 9 is a perspective view of a post locking feature and a frame rail locking feature.

The accessory rack system 24 comprises at least one post 38. The post 38 comprises two opposing ends 72. One of the ends 72 interfaces with the frame rail 36 and the opposing end 72 is located a distance above the frame rail 36. A post locking feature 92, shown in FIG. 8, is located on the end 72 interfacing with the frame rail 36. The post locking feature 92 cooperates with the frame rail locking feature 98, which is an insert installed in the frame rail 36.

FIG. 8 illustrates a perspective view of a post 38. The post 38 comprises two opposing ends 72. One end 72 is provided with a post locking feature 92. The post locking feature 92 is a pin 94. The pin 94 comprises two grooves 96 formed on opposing portions of the pin 94. Each of the grooves 96 include a portion that extends circumferentially around the pin 94 and a portion that extends lengthwise along the pin 94, the portions being connected to one another.

FIG. 9 illustrates a perspective view of a post locking feature 92 and a frame rail locking feature 98. The post locking feature 92 is a pin 94 with two grooves 96 formed therein. One of the grooves 96 is visible while the other is located on an opposing portion of the pin 94, indicated by the dashed lines. The grooves 96 include a portion that extends circumferentially around the pin 94 and a portion that extends lengthwise along the pin 94, the portions being connected to one another.

The frame rail locking feature 98 includes a hole 102, which is adapted to accept the pin 94. The hole 102 is defined by a cylindrical insert 100. The insert 100 is located into an opening formed in the frame rail 36. Two groove guides 104 are provided on opposing portions of the interior of the hole 102. The two groove guides 104 cooperate with the two grooves 96 formed in the pin 94.

To engage the post locking feature 92 with the frame rail locking feature 98, the pin 94 is radially oriented so that the lengthwise extending portion of the grooves 96 align with the groove guides 104. The pin 94 is then lowered into the hole 102 until the groove guides 104 reach the transition between the portion of the grooves 96 that extends lengthwise along the pin 94 and the portion of the grooves 96 that extends circumferentially around the pin 94. The pin 94 is then rotated clockwise until the groove guides 104 locate at the terminus of the circumferentially extending portion of the grooves 96. In this position, axial displacement of the post locking feature 92 from the frame rail locking feature 98 is precluded.

Figure 10A:
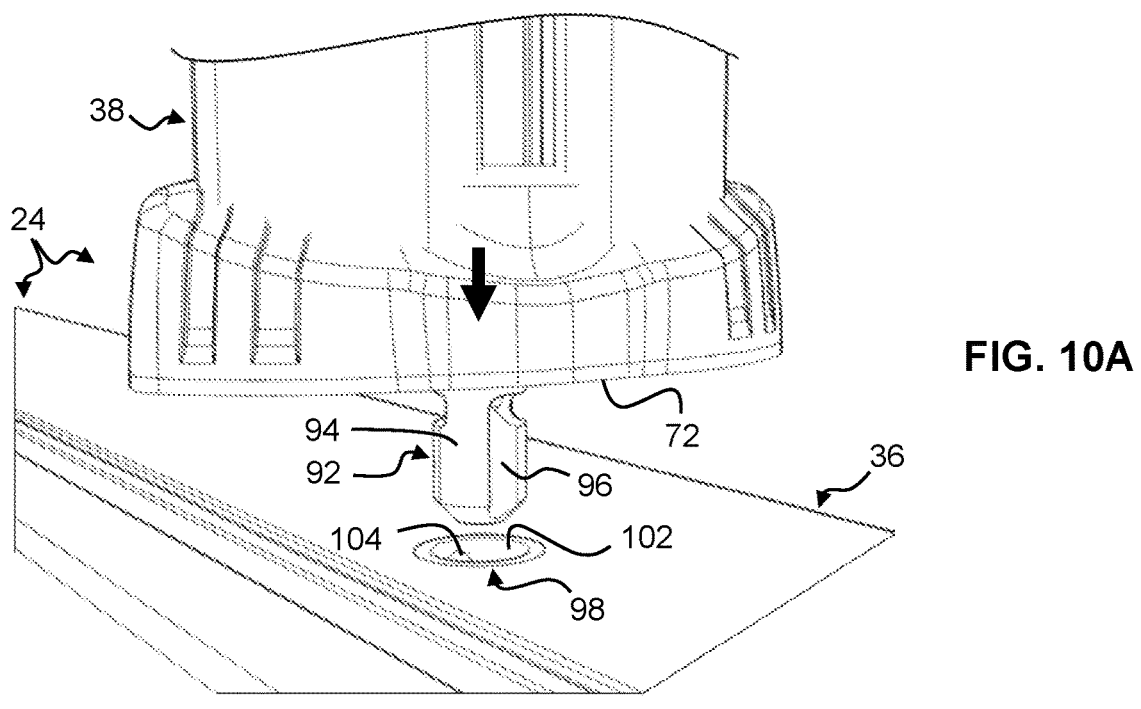
FIG. 10A illustrates a locking operation of an accessory rack system.
Figure 10B:
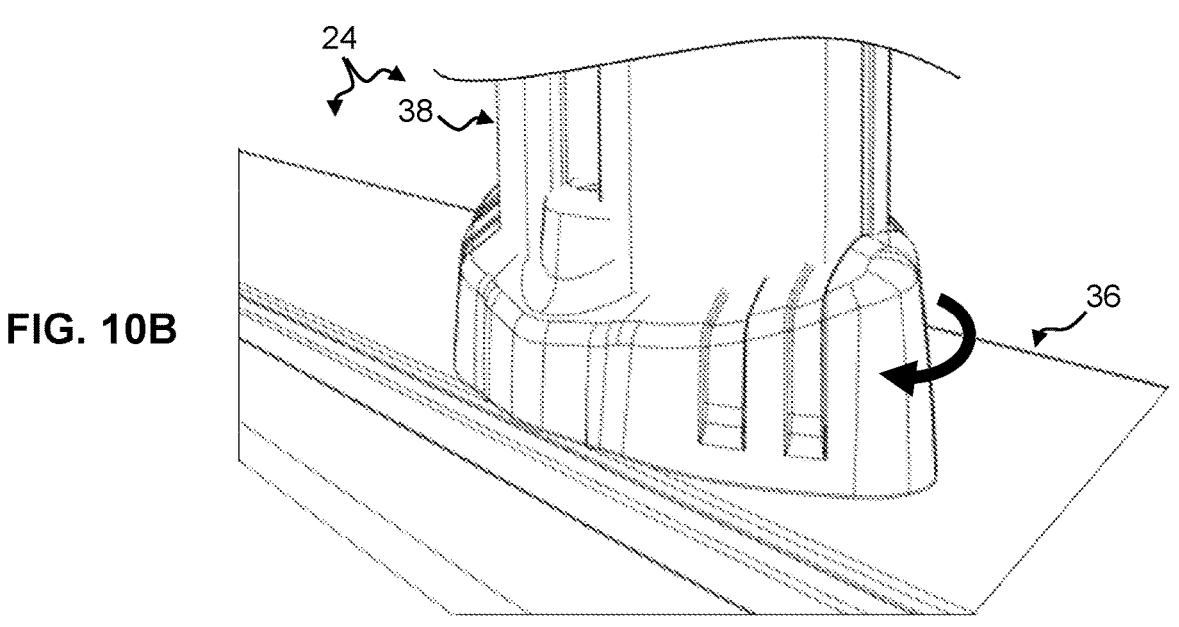
FIG. 10B illustrates a locking operation of an accessory rack system.

FIG. 10A and FIG. 10B illustrate a locking operation of an accessory rack system 24 according to the present disclosure.

In FIG. 10A a post locking feature 92 in the form of a pin 94 is being brought into engagement with a frame rail locking feature 98 as a post 38 is lowered toward a frame rail 36. The post 38 is radially oriented so that the grooves 96 of the pin 94 align with groove guides 104 located within a hole 102 of the frame rail locking feature 98.

In FIG. 10B the pin 94 has entered the hole 102 of the frame rail locking feature 98 shown in FIG. 10A. The post 38 is rotated clockwise relative to the frame rail 36 to locate the groove guides 104 at the terminus of the circumferentially extending portion of the grooves 96, shown in FIG. 9.

Figure 11:
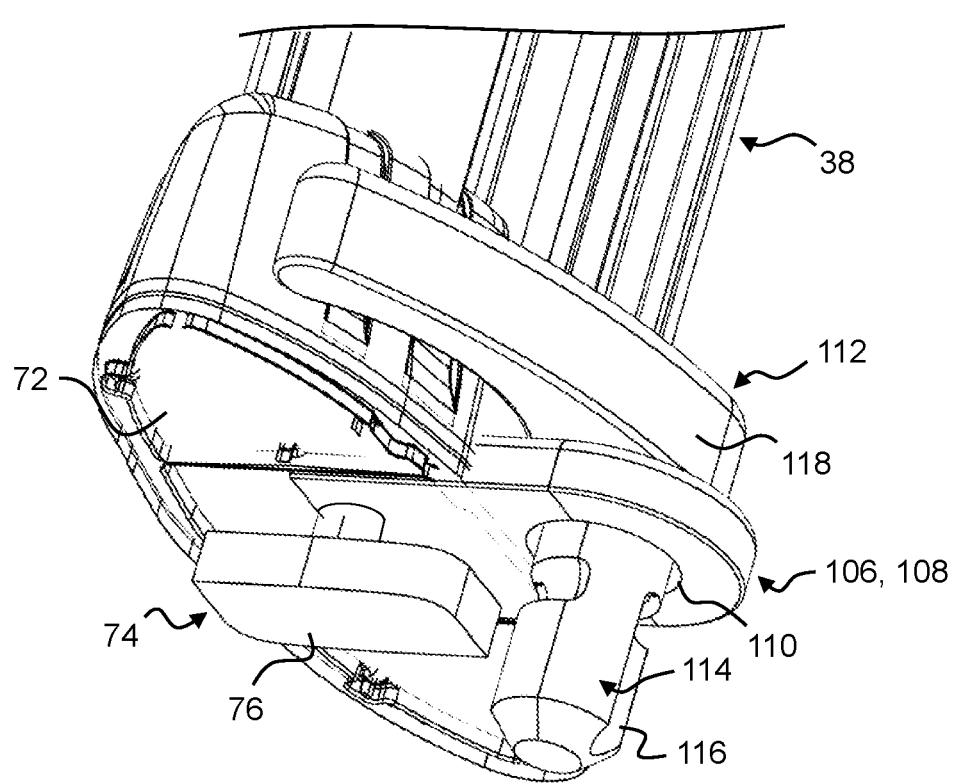
FIG. 11 is a perspective view of a post.

FIG. 11 illustrates a perspective view of a post 38. The post 38 employs two locking mechanisms having features illustrated in FIG. 3 and FIG. 8. The post 38 comprises two opposing ends 72, shown in FIG. 1A and FIG. 1B. One end 72 is provided with a first post locking feature 74 and a second post locking feature 106.

The first post locking feature 74 comprises a wedge 76. The wedge 76 is adapted to locate within a track 46 of a frame rail 36, shown in FIG. 12A.

The second post locking feature 106 is a bracket 108 extending from the end 72 of the post 38. A hole 110 is formed through the bracket 108.

The second post locking feature 106 cooperates with a locking member 112. The locking member 112 comprises a pin 114 with two grooves 116 formed on opposing sides thereon. A handle 118 is provided on one end of the pin 114 to assist users with rotating the pin 114. The pin 114 extends through the hole 110 of the bracket 108.

FIG. 12A through FIG. 12D illustrate a locking operation of an accessory rack system 24 according to the present disclosure.

Figure 12A:
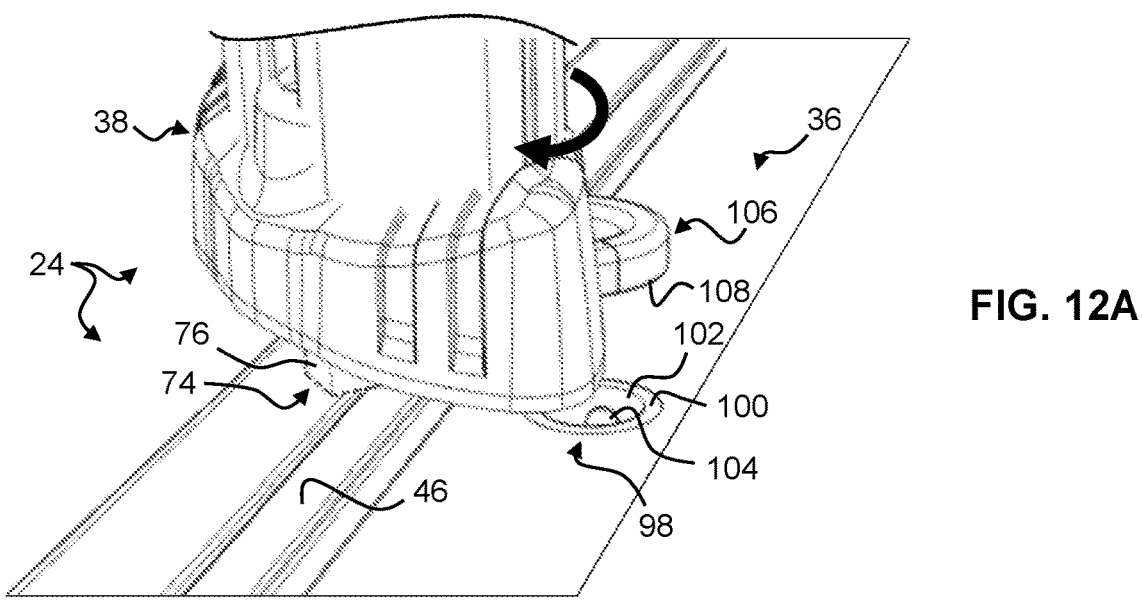
FIG. 12A illustrates a locking operation of an accessory rack system.

FIG. 12A illustrates a post 38 that has been brought into engagement with a frame rail 36. The post 38 comprises a first post locking feature 74 comprising a wedge 76 and a first frame rail locking feature 44, which is a track 46. The wedge 76 is located within the track 46.

The frame rail 36 comprises a second frame rail locking feature 98 comprising an insert 100 defining a hole 102 and groove guides 104 located within the hole 102.

The post 38 comprises a second post locking feature 106, which is a bracket 108 extending from the post 38. The second post locking feature 106 approaches the second frame rail locking feature 98 as the post 38 is rotated.

Figure 12B:
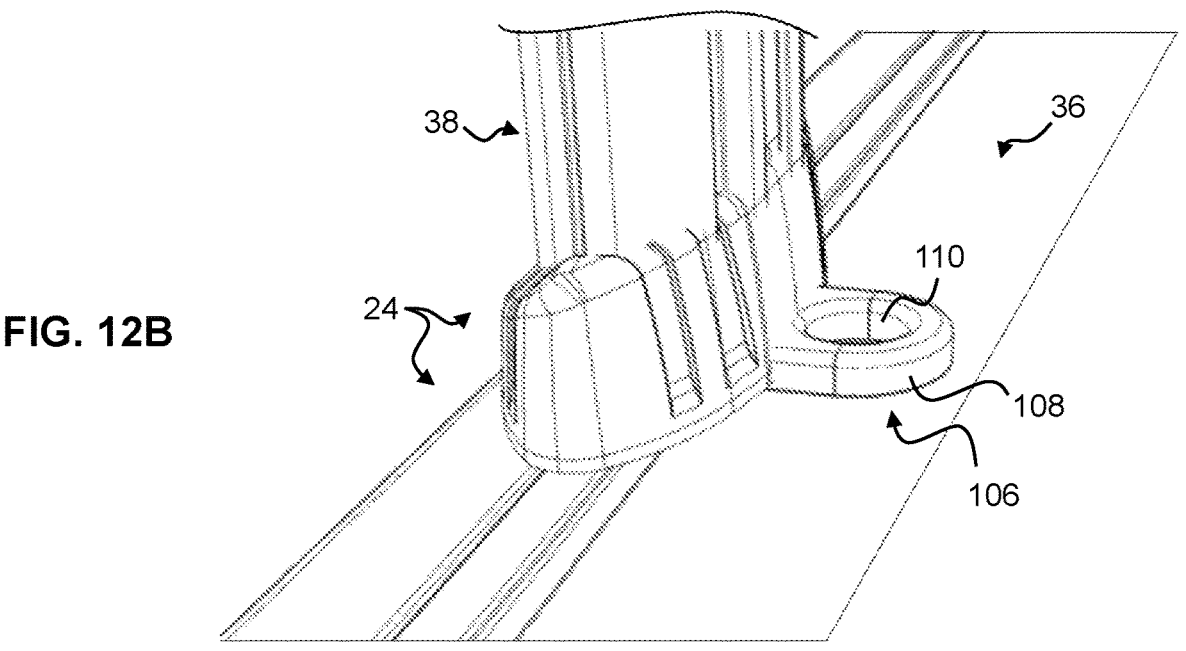
FIG. 12B illustrates a locking operation of an accessory rack system.

FIG. 12B illustrates a post 38 in a locked engagement with the frame rail 36. The second post locking feature 106 has been rotated such that a hole 110 formed therein is coaxial with the hole 102 of the second frame rail locking feature 98, shown in FIG. 12A.

Figure 12C:
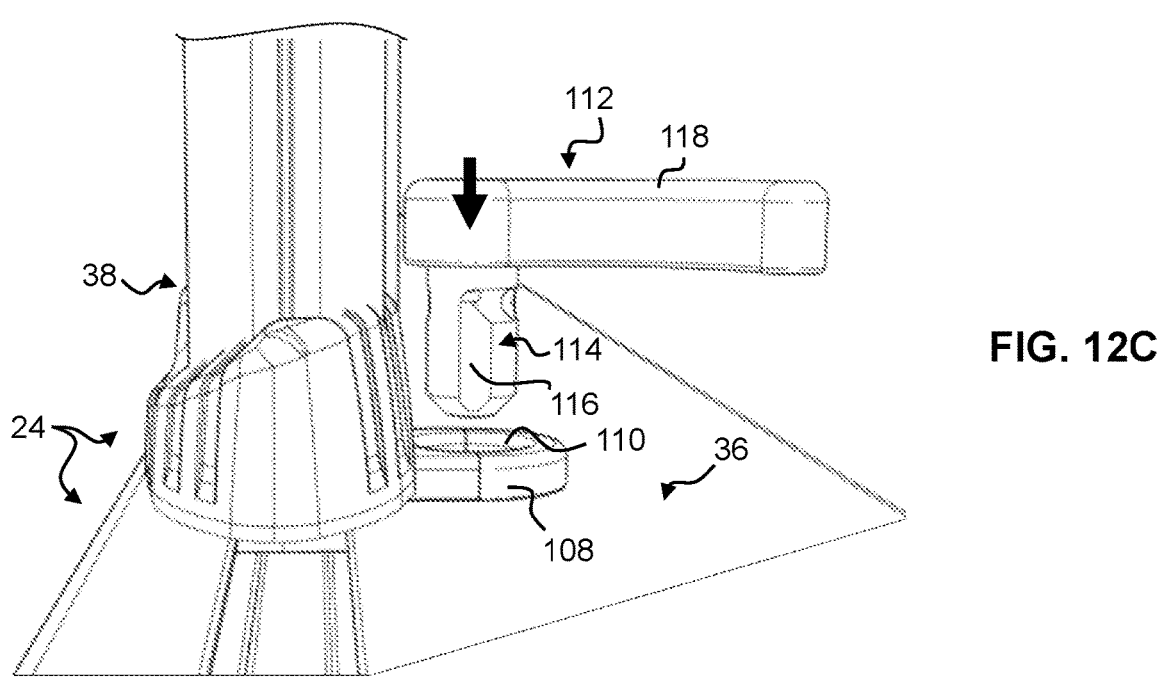
FIG. 12C illustrates a locking operation of an accessory rack system.

FIG. 12C illustrates a post 38 in a locked engagement with the frame rail 36. The accessory rack system 24 includes a locking member 112 for providing additional securement of the post 38 to the frame rail 36 by preventing rotation of the post 38 relative to the frame rail 36. The locking member 112 comprises a pin 114 with two grooves 116 formed on opposing portions thereon. A handle 118 is provided on one end of the pin 114 to assist users with rotating the pin 114.

The pin 114 is axially inserted through the hole 110 of the bracket 108 and into the hole 102 of the second frame rail locking feature 98, shown in FIG. 12A. The second frame rail locking feature 98 includes groove guides 104 located within the hole 102, shown in FIG. 12A. The groove guides 104 cooperate with the two grooves 116 of the locking member 112. The pin 114 is lowered into the hole 102 until the groove guides 104 reach the transition between the portion of the grooves 116 that extends lengthwise along the pin 114 and the portion of the grooves 116 that extends circumferentially around the pin 114.

Figure 12D:
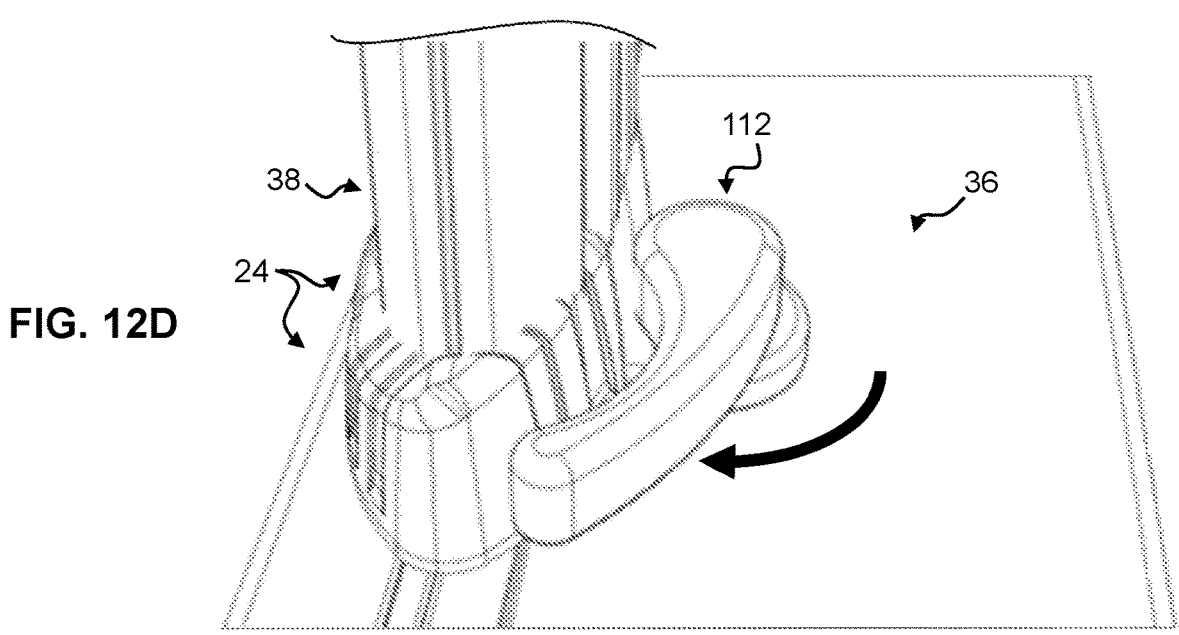
FIG. 12D illustrates a locking operation of an accessory rack system.

FIG. 12D illustrates a post 38 in a locked engagement with the frame rail 36. The locking member 112 is rotated clockwise until the groove guides 104 locate at the terminus of the circumferentially extending portion of the grooves 96, shown in FIG. 12C. In this position, axial displacement of the locking member 112 from the second frame rail locking feature 98 is precluded.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Many embodiments as well as many applications besides the examples provided will be apparent to those of skill in the art upon reading the above description.

It is understood that the above description is intended to be illustrative and not restrictive. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled.

The omission in the following claims of any aspect of subject matter that is disclosed herein is not a disclaimer of such subject matter, nor should it be regarded that the inventors did not consider such subject matter to be part of the disclosed inventive subject matter.

The disclosures of all articles and references, including patent applications and publications, are incorporated by reference for all purposes.

Other combinations are also possible as will be gleaned from the following claims, which are also hereby incorporated by reference into this written description.

Plural elements or steps can be provided by a single integrated element or step. Alternatively, a single element or step might be divided into separate plural elements or steps. The disclosure of "a" or "one" to describe an element or step is not intended to foreclose additional elements or steps.

While the terms first, second, third, etc., may be used herein to describe various elements, components, regions, layers, and/or sections, these elements, components, regions, layers, and/or sections should not be limited by these terms. These terms may be used to distinguish one element, component, region, layer or section from another region, layer, or section. Terms such as "first", "second", and other numerical terms when used herein do not imply a sequence or order unless clearly indicated by the context. Thus, a first element, component, region, layer, or section discussed herein could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below," or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time, and the like is, for example, from 1 to 90, from 20 to 80, or from 30 to 70, it is intended that intermediate range values such as (e.g., 15 to 85, 22 to 68, 43 to 51, 30 to 32, etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

REFERENCE NUMERALS

10 Vehicle
12 Cargo area
14 Side walls
16 Front wall
18 Tailgate
20 Floor
22 Top surface
24 Accessory rack system
26 Accessory
28 Tonneau cover
30 Panels of tonneau cover
32a Top surface of tonneau cover panels
32b Bottom surface of tonneau cover panels
34 Crossbar

24

36 Frame rail
38 Post
40 Side wall support portion
42 Side wall support surface
44 First frame rail locking feature
46 Track
48 Opening
50 Flange
52 Bottom surface of the track
54 Vertical surface of the track
56 Width of the track
58 Width of the opening
60 Clamp plate
62 First side
64 Second side
66 Fastener
68 Tonneau cover support portion
70 Tonneau cover support surface
72a End
72b End
74 First post locking feature
76 Wedge
78 Width
80 Length
82 Neck
84 Diameter
86 Rounded corner
88 Squared corner
90 Bevel
92 First post locking feature
94 Pin
96 Groove
98 Second frame rail locking feature
100 Insert
102 Hole
104 Groove guide
106 Second post locking feature
108 Bracket
110 Hole
112 Locking member
114 Pin
116 Groove
118 Handle

What is claimed is:
1. An accessory rack system comprising:
a frame rail adapted to couple to a side wall of a cargo area, the frame rail comprising:
one or more frame rail locking features, and
a tonneau cover support portion adapted for supporting a tonneau cover over the cargo area;
at least one post engageable with the frame rails, the at least one post comprising one or more post locking feature extending from an end of the at least one post; and
wherein one of the post locking features is inserted into one of the frame rail locking features in a direction orthogonal to a longitudinal direction of the frame rail and, with rotation of the at least one post, rotates into locking engagement with the one of the frame rail locking features so that the at least one post is prevented from disengaging from the frame rail and/or prevented from longitudinal translation along the frame rail, and
wherein the one or more frame rail locking features include a track extending at least partially the length of each of the frame rail and the one or more post locking features include a wedge extending from an end of the at least one post; and wherein the track accepts the wedge.

2. The accessory rack system according to claim 1, wherein the track is accessible through an opening defined between two opposing flanges; and wherein the width of the track is greater than the width of the opening.

3. The accessory rack system according to claim 2, wherein the width of the wedge is generally equal to or less than the width of the opening; wherein the wedge is locatable within the track through the opening by aligning the width of the wedge with the width of the opening; and wherein the length of the wedge is generally equal to the width of the track.

4. The accessory rack system according to claim 3, wherein the wedge comprises two opposing rounded corners and two opposing squared corners; wherein by twisting the wedge the two opposing rounded corners slide against opposing surfaces of the track and the two opposing squared corners preclude further rotation of the wedge.

5. The accessory rack system according to claim 4, wherein at least one edge of the wedge is beveled so that twisting the wedge into locking engagement with the track causes a surface of the track to translate along the at least one beveled edge and frictionally engage with the wedge.

6. The accessory rack system according to claim 5, wherein the wedge is translatable along the length of the track when not in a locked engagement with the track.

7. An accessory rack system comprising:
a frame rail adapted to couple to a side wall of a cargo area, the frame rail comprising:
one or more frame rail locking features, and
a tonneau cover support portion adapted for supporting a tonneau cover over the cargo area;
at least one post engageable with the frame rails, the at least one post comprising one or more post locking feature extending from an end of the at least one post; and
wherein one of the post locking features rotates into locking engagement with one of the frame rail locking features so that the at least one post is prevented from disengaging from the frame rail and/or prevented from longitudinal translation along the frame rail;
wherein the frame rail comprises a first frame rail locking feature and one or more second frame rail locking features; and
the at least one post comprises a first post locking feature and a second post locking feature.

8. The accessory rack system according to claim 7, wherein the first frame rail locking feature includes a track and the one or more second frame rail locking features include one or more holes disposed at one or more locations along the length of the frame rail; and wherein the first post locking feature includes a wedge that is engageable with the track, and the second post locking feature includes a bracket having a hole that is coaxially alignable with the holes of the one or more second frame rail locking features.

9. The accessory rack system according to claim 8, wherein twisting of the at least one post relative to the frame rail causes the hole of the bracket to align coaxially with the holes of the one or more second frame rail locking features.

10. The accessory rack system according to claim 9, wherein the accessory rack system comprises a locking member; wherein the locking member comprises a pin and a handle extending from an end of the pin; wherein the pin extends through the hole of the bracket and into the hole of the one or more second frame rail locking features; and wherein the handle assists a user twist the pin.

11. The accessory rack system according to claim 10, wherein the pin of the locking member is insertable into the second post locking feature and the one or more second frame rail locking features upon the coaxial alignment of the hole of the bracket with the holes of the one or more second frame rail locking features; and wherein the locking member prevents rotation of the wedge within the track.

12. The accessory rack system according to claim 11, wherein the one or more holes of the one or more second frame rail locking features comprise one or more groove guides extending from an inner surface of the one or more holes and the pin comprises one or more grooves formed into the pin; and wherein the one or more grooves are adapted to accept the one or more groove guides.

13. The accessory rack system according to claim 12, wherein the one or more grooves extend in a first direction along a length of the pin and then in a second direction along a circumference of the pin such that translating the one or more groove guides within the one or more grooves in the second direction prevents axial displacement of the at least one post from the frame rails.

14. The accessory rack system according to claim 13, wherein the second direction is oriented generally 90° to the first direction.

15. The accessory rack system according to claim 1, wherein the engagement of the at least one post with the frame rail does not interfere with the supporting of a tonneau cover by the frame rail or a folding operation of the tonneau cover.

16. The accessory rack system of according to claim 1, further comprising a cross bar connected to and extending from the at least one post.

* * * * *